United States Patent
Ishido et al.

(10) Patent No.: US 7,782,503 B2
(45) Date of Patent: Aug. 24, 2010

(54) IMAGE READING APPARATUS AND METHOD FOR CONTROLLING THE SAME

(75) Inventors: Katsuhiro Ishido, Abiko (JP); Shinichiro Wakahara, Katsushika-Ku (JP); Shouhei Takeda, Toride (JP); Jiro Futagawa, Moriya (JP); Yuichi Makino, Abiko (JP); Takashi Soya, Abiko (JP); Masafumi Kamei, Kashiwa (JP); Tetsuro Fukusaka, Abiko (JP); Kazunori Togashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1036 days.

(21) Appl. No.: 11/332,317

(22) Filed: Jan. 17, 2006

(65) Prior Publication Data

US 2006/0170990 A1    Aug. 3, 2006

(30) Foreign Application Priority Data

Jan. 17, 2005    (JP)    ............................. 2005-009239

(51) Int. Cl.
*H04N 1/04* (2006.01)
(52) U.S. Cl. ..................... 358/498; 358/463; 382/275
(58) Field of Classification Search ................ 358/463, 358/498; 382/275
See application file for complete search history.

(56) References Cited

U.S. PATENT DOCUMENTS

| 5,123,054 | A | * | 6/1992 | Hara et al. ................... 382/130 |
| 5,231,574 | A | * | 7/1993 | Agano ......................... 382/132 |
| 5,317,420 | A | * | 5/1994 | Kuwahara .................... 358/463 |
| 5,649,022 | A | * | 7/1997 | Maeda et al. ................ 382/141 |
| 5,663,569 | A | * | 9/1997 | Hayano .................. 250/559.45 |
| 5,812,109 | A | * | 9/1998 | Kaifu et al. .................. 345/104 |
| 5,850,465 | A | * | 12/1998 | Shimura et al. ............. 382/132 |
| 5,881,182 | A | * | 3/1999 | Fiete et al. ................... 382/275 |
| 5,914,485 | A | * | 6/1999 | Kobayashi et al. ........ 250/208.1 |
| 5,956,087 | A | * | 9/1999 | Takayama et al. ........... 348/275 |
| 5,982,946 | A | * | 11/1999 | Murakami ................... 382/272 |
| 6,084,627 | A | * | 7/2000 | Cook et al. .................. 347/248 |
| 6,225,934 | B1 | * | 5/2001 | Ohashi et al. ................ 341/155 |
| 6,295,390 | B1 | * | 9/2001 | Kobayashi et al. .......... 382/313 |
| 6,297,493 | B1 | * | 10/2001 | Kobayashi et al. ...... 250/214 R |
| 6,393,161 | B1 | * | 5/2002 | Stevenson et al. ........... 382/275 |

(Continued)

FOREIGN PATENT DOCUMENTS

JP    10-111930    4/1998

(Continued)

*Primary Examiner*—King Y Poon
*Assistant Examiner*—Kenneth Kwan
(74) *Attorney, Agent, or Firm*—Fitzpatrick, Cella, Harper & Scinto

(57) ABSTRACT

An image reading apparatus reads an image from a document being simultaneously fed by the apparatus. A document feeder unit feeds the document on a original plate. A first image reading unit reads an image from the fed document at a first document-read position on the original plate. A second image reading unit reads an image from the fed document at a second document-read position located at a predetermined distance from the first document-read position in a document feeding direction. An abnormal pixel detection unit detects abnormal pixels resulting from rubbish moved between the first document-read position and second document-read position on the original plate together with the document.

6 Claims, 22 Drawing Sheets

U.S. PATENT DOCUMENTS

| | | | | |
|---|---|---|---|---|
| 6,465,801 B1* | 10/2002 | Gann et al. | ............... | 250/559.4 |
| 6,476,867 B1* | 11/2002 | Kobayashi et al. | ........... | 348/307 |
| 6,563,938 B1* | 5/2003 | Harada | ........................ | 382/108 |
| 6,567,192 B1* | 5/2003 | Toyomura et al. | ........... | 358/497 |
| 6,600,579 B1* | 7/2003 | Kumagai et al. | ............ | 358/474 |
| 6,618,173 B1* | 9/2003 | Nobel et al. | .................. | 358/513 |
| 6,636,630 B1* | 10/2003 | Adachi et al. | ................. | 382/176 |
| 6,664,527 B2* | 12/2003 | Kobayashi et al. | ........ | 250/208.1 |
| 6,728,418 B1* | 4/2004 | Kumagai et al. | ............ | 382/275 |
| 6,750,990 B1* | 6/2004 | Ohashi | ........................ | 358/496 |
| 6,792,161 B1* | 9/2004 | Imaizumi et al. | ............ | 382/275 |
| 6,839,153 B1* | 1/2005 | Shimizu | ..................... | 358/3.21 |
| 6,912,322 B2* | 6/2005 | Smith et al. | ................... | 382/275 |
| 6,937,361 B1* | 8/2005 | Kondo et al. | .................. | 358/1.9 |
| 7,016,534 B2* | 3/2006 | Fukawa et al. | ............... | 382/168 |
| 7,031,543 B2* | 4/2006 | Cheng et al. | .................. | 382/254 |
| 7,031,551 B2* | 4/2006 | Yano et al. | .................... | 382/275 |
| 7,058,236 B2* | 6/2006 | Ohashi | ........................ | 382/275 |
| 7,072,075 B2* | 7/2006 | Kondo et al. | .................. | 358/1.9 |
| 7,119,926 B2* | 10/2006 | Takeda et al. | ................. | 358/1.9 |
| 7,170,042 B2* | 1/2007 | Kobayashi et al. | ........ | 250/208.1 |
| 7,218,425 B2* | 5/2007 | Saida et al. | ................... | 358/437 |
| 7,253,932 B2* | 8/2007 | Tsutsumi | ..................... | 358/498 |
| 7,313,288 B2* | 12/2007 | Dierickx | ..................... | 382/274 |
| 7,349,108 B2* | 3/2008 | Ito | ............................. | 358/1.12 |
| 7,359,093 B2* | 4/2008 | Schweid et al. | ............. | 358/3.26 |
| 7,440,608 B2* | 10/2008 | Silverstein | .................. | 382/149 |
| 7,440,639 B2* | 10/2008 | Ishiguro et al. | ............. | 382/312 |
| 7,444,028 B2* | 10/2008 | Takahashi | .................... | 382/237 |
| 7,474,437 B2* | 1/2009 | Ishido | ........................ | 358/1.9 |
| 7,508,541 B2* | 3/2009 | Ishiguro | ........................ | 358/1.9 |
| 7,518,757 B2* | 4/2009 | Chizawa et al. | ............. | 358/461 |
| 7,528,997 B2* | 5/2009 | Gusmano et al. | ............ | 358/474 |
| 7,538,907 B2* | 5/2009 | Nagasaka | ..................... | 358/1.9 |
| 7,551,326 B2* | 6/2009 | Saka et al. | .................... | 358/463 |
| 2002/0071135 A1* | 6/2002 | Takeda et al. | ................ | 358/1.14 |
| 2002/0158192 A1* | 10/2002 | Gann | ......................... | 250/234 |
| 2002/0176634 A1* | 11/2002 | Ohashi | ........................ | 382/275 |
| 2002/0196476 A1* | 12/2002 | Ozaki | ........................ | 358/406 |
| 2003/0086597 A1* | 5/2003 | Ohta et al. | ................... | 382/131 |
| 2003/0090742 A1* | 5/2003 | Fukuda et al. | ............... | 358/448 |
| 2003/0174221 A1* | 9/2003 | Tsuda | ........................ | 348/241 |
| 2003/0219170 A1* | 11/2003 | Ishido | ........................ | 382/275 |
| 2004/0057616 A1* | 3/2004 | Kondo et al. | ................. | 382/167 |
| 2004/0114827 A1* | 6/2004 | Chizawa et al. | ............. | 382/274 |
| 2004/0125412 A1* | 7/2004 | Sugeta | ........................ | 358/3.26 |
| 2004/0165228 A1* | 8/2004 | Ueno | ......................... | 358/483 |
| 2004/0207887 A1* | 10/2004 | Makino et al. | ............... | 358/496 |
| 2004/0246540 A1* | 12/2004 | Makino | ...................... | 358/498 |
| 2005/0083543 A1* | 4/2005 | Suzuki et al. | ................. | 358/1.9 |
| 2005/0280867 A1* | 12/2005 | Arai | ............................ | 358/2.1 |
| 2006/0061830 A1* | 3/2006 | Sakakibara | ................. | 358/448 |
| 2006/0061836 A1* | 3/2006 | Maruchi et al. | ............. | 358/483 |
| 2006/0066915 A1* | 3/2006 | Saka et al. | .................... | 358/463 |
| 2006/0066920 A1* | 3/2006 | Saka et al. | .................... | 358/474 |
| 2006/0066921 A1* | 3/2006 | Saka et al. | .................... | 358/474 |
| 2006/0098248 A1* | 5/2006 | Suzuki et al. | ................. | 358/496 |
| 2006/0109522 A1* | 5/2006 | Wang | ......................... | 358/463 |
| 2006/0115177 A1* | 6/2006 | Ishiga | ........................ | 382/275 |
| 2006/0170990 A1* | 8/2006 | Ishido et al. | ................. | 358/498 |
| 2006/0239580 A1* | 10/2006 | Dierickx | ..................... | 382/274 |
| 2007/0002393 A1* | 1/2007 | Okawa | ........................ | 358/462 |
| 2007/0109605 A1* | 5/2007 | Shimizu | ..................... | 358/3.26 |
| 2007/0127840 A1* | 6/2007 | Gardner et al. | ............. | 382/275 |
| 2007/0158536 A1* | 7/2007 | Gann | ......................... | 250/234 |
| 2007/0269127 A1* | 11/2007 | Kusaka | ...................... | 382/255 |
| 2007/0291324 A1* | 12/2007 | Kamei et al. | ................ | 358/474 |
| 2008/0044070 A1* | 2/2008 | Nie | ............................. | 382/128 |
| 2008/0137107 A1* | 6/2008 | Futami | ........................ | 358/1.4 |
| 2008/0180514 A1* | 7/2008 | Sekizawa et al. | ............ | 347/252 |
| 2008/0225355 A1* | 9/2008 | Kagami | ...................... | 358/496 |
| 2008/0240559 A1* | 10/2008 | Malvar | ....................... | 382/167 |
| 2008/0303920 A1* | 12/2008 | Kinoshita | ................ | 348/226.1 |
| 2009/0009828 A1* | 1/2009 | Kagami | ...................... | 358/498 |

FOREIGN PATENT DOCUMENTS

| | | |
|---|---|---|
| JP | 2000-152008 | 5/2000 |
| JP | 2000-196814 | 7/2000 |
| JP | 2001-157005 | 6/2001 |

\* cited by examiner

FIG. 8

| MAIN SCANNING ADDRESS 0 | MAIN SCANNING ADDRESS 1 | MAIN SCANNING ADDRESS 2 | MAIN SCANNING ADDRESS 3 | MAIN SCANNING ADDRESS 4 | MAIN SCANNING ADDRESS 5 | ... | MAIN SCANNING ADDRESS N — 801 |
|---|---|---|---|---|---|---|---|
| SUB-SCANNING START LINE INFORMATION | SUB-SCANNING START LINE INFORMATION | SUB-SCANNING START LINE INFORMATION | SUB-SCANNING START LINE INFORMATION | SUB-SCANNING START LINE INFORMATION | SUB-SCANNING START LINE INFORMATION | ... | SUB-SCANNING START LINE INFORMATION — 802 |
| NUMBER OF SEQUENTIAL PIXELS | NUMBER OF SEQUENTIAL PIXELS | NUMBER OF SEQUENTIAL PIXELS | NUMBER OF SEQUENTIAL PIXELS | NUMBER OF SEQUENTIAL PIXELS | NUMBER OF SEQUENTIAL PIXELS | ... | NUMBER OF SEQUENTIAL PIXELS — 803 |

EXAMPLE OF WHITE LINE-LIKE IMAGE
WITH WIDTH EQUAL TO TWO PIXELS

FIG. 12
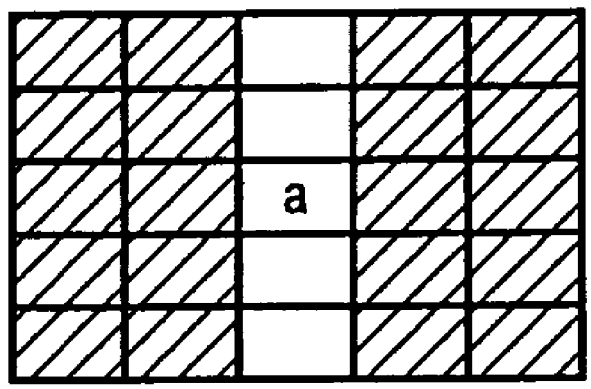
 CORRELATIVITY DETECTING AMBIENT PIXELS
a : TARGET PIXEL

BEFORE SUBSTITUTION

AFTER SUBSTITUTION

IMAGE READING APPARATUS AND METHOD FOR CONTROLLING THE SAME

FIELD OF THE INVENTION

This invention relates to a technique for reading images from documents.

BACKGROUND OF THE INVENTION

Roughly two document reading techniques are available for image reading apparatuses such as digital copiers, scanners, and facsimile machines. One of the two techniques is to read an image from a document by moving an optical system with the document placed on a original plate to fix the position of the document (optical system moving method). The other is to read an image from a document by using an auto document feeder (ADF) to feed the document, with the position of the optical system fixed (document moving method).

In particular, with the document moving method, rubbish attached to the original plate may disadvantageously appear in the document image as a line-like image.

To solve this problem, a method has been proposed (Japanese Patent Laid-Open No. 2000-196814). This method is used in a sheet through document reading apparatus having a document feeder. When the apparatus performs a main scanning operation at a predetermined time and detects an abnormal data value, a document-read position is changed in accordance with a predetermined method.

A method for detecting rubbish on the basis of a read image has also been proposed (Japanese Patent Laid-Open No. 2000-152008). With this method, if any portion in an image read by one of plural reading means does not match the same portion in an image read by another reading means, this portion is determined to be a line-like image.

However, the invention described in Japanese Patent Laid-Open No. 2000-196814 detects, as a line-like image, consecutive image data each having a value equal to or larger than a predetermine value or equal to or smaller than a predetermined value. Consequently, even image data for a vertical line present in a document is mistakenly detected as rubbish.

Further, the invention described in Japanese Patent Laid-Open No. 2000-152008 can detect rubbish attached only to the document-read position of one of the plural reading means. However, this technique is disadvantageous in that rubbish such as waste yarn or hair which moves with the document cannot be detected. This is because such rubbish moves together with the document between the document-read positions of the corresponding reading means, so that images read at these document-read positions match.

SUMMARY OF THE INVENTION

It is thus feature of the present invention to solve at least one of the above and other problems. The other problems will be understood throughout the specification.

The present invention is suitably applied to an image reading apparatus that reads an image from a document being simultaneously fed by the apparatus. A document feeder unit feeds the document on a original plate. A first image reading unit reads an image from the fed document at a first document-read position on the original plate. A second image reading unit reads an image from the fed document at a second document-read position located at a predetermined distance from the first document-read position in a document feeding direction. An abnormal pixel detection unit detects abnormal pixels resulting from rubbish moved between the first document-read position and second document-read position on the original plate together with the document.

The present invention reduces the probability of mistakenly detecting image data on a vertical line present in a document as rubbish. Moreover, the present invention makes it possible to suitably detect an abnormal image caused by relatively long rubbish such as waste yarn or hair.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing an example of contents stored in a candidate-for-line-like-image detection memory in accordance with the embodiment;

FIG. 12 is a diagram showing another example of the relationship between a target pixel and ambient pixels in accordance with the embodiment;

DETAILED DESCRIPTION OF PREFERRED EMBODIMENTS

An embodiment of the present invention will be shown below which is useful in understanding the super-concept, mid-concept, and sub-concept of the present invention. Not all the concepts included in the embodiment below are described in the claims. However, it should be appreciated by those skilled in the art that these concepts are not consciously excluded from the technical scope of the present invention but are equivalent to the present invention and are thus not described in the claims.

First Embodiment

Figure 1:
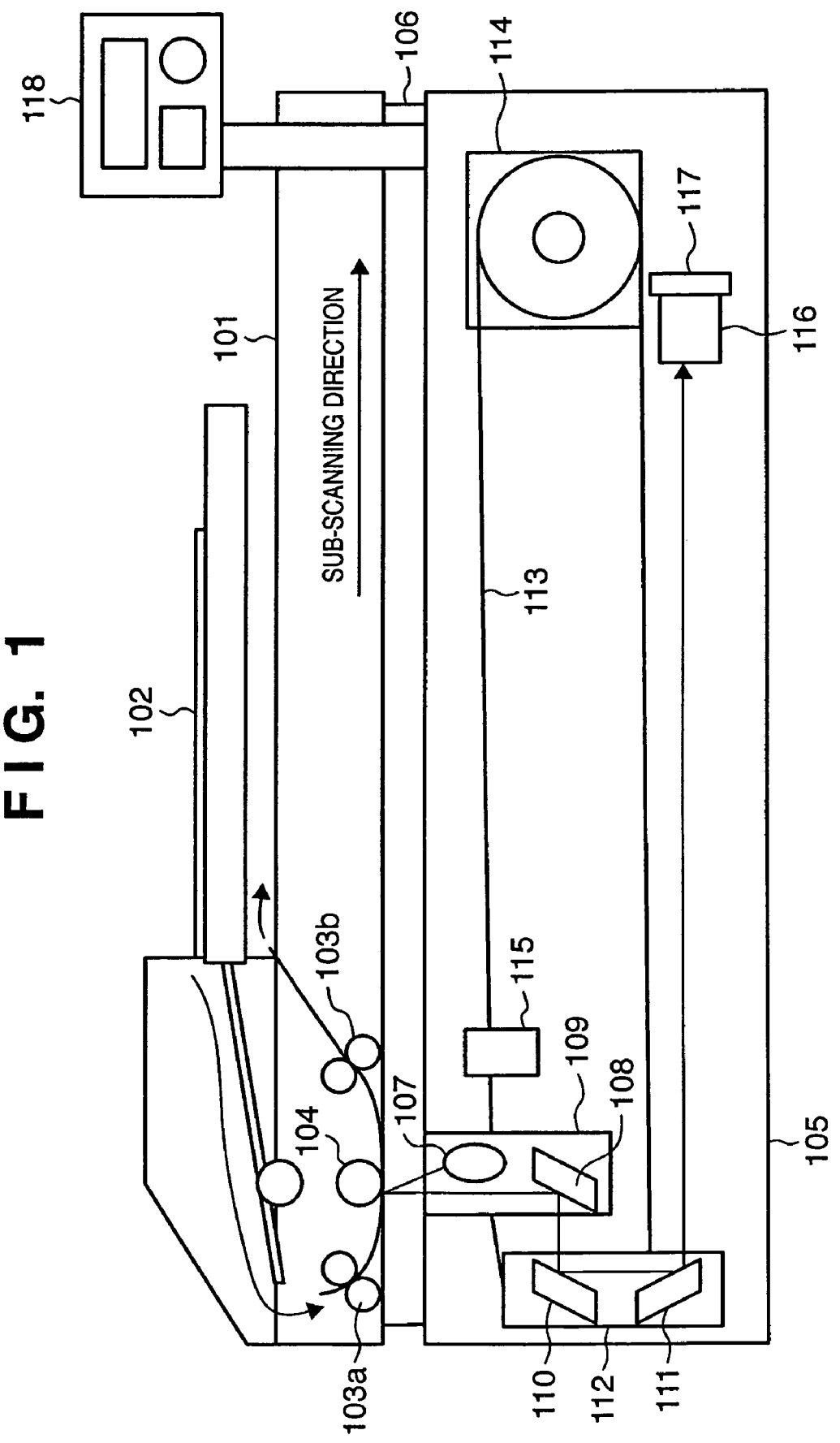
FIG. 1 is a diagram showing an example of an image reading apparatus in accordance with an embodiment.

FIG. 1 is a diagram showing an image reading apparatus in accordance with an embodiment. Here a common scanner apparatus reading an image from a document fed by an ADF is shown as an example.

A document 102 is fed by feeding rollers 103a and 103b of an ADF 101 in a direction shown by arrows in the figure. In this case, the document 102 passes on original plate 106 placed between a platen roller 104 and a housing 105.

An image reading unit is placed in the housing 105. The image reading unit comprises an optical bench 109 and an optical bench 112. The optical bench 109 comprises a lamp 107 that irradiates a surface of the document with light and a mirror 108 that reflects the light from the lamp 107 reflected by the document 102. The optical bench 112 comprises mirrors 110 and 111 that direct light reflected by the mirror 108, toward a lens 116.

The optical benches 109 and 112 are connected to a motor 114 using a wire 113. A position sensor 115 detects a home position of the optical bench 109. The optical bench 109 forwardly and reversely rotates the motor 114 using the home position as a reference. The optical benches 109 and 112 are thus moved to scan the document on the original plate 106.

Figure 5:
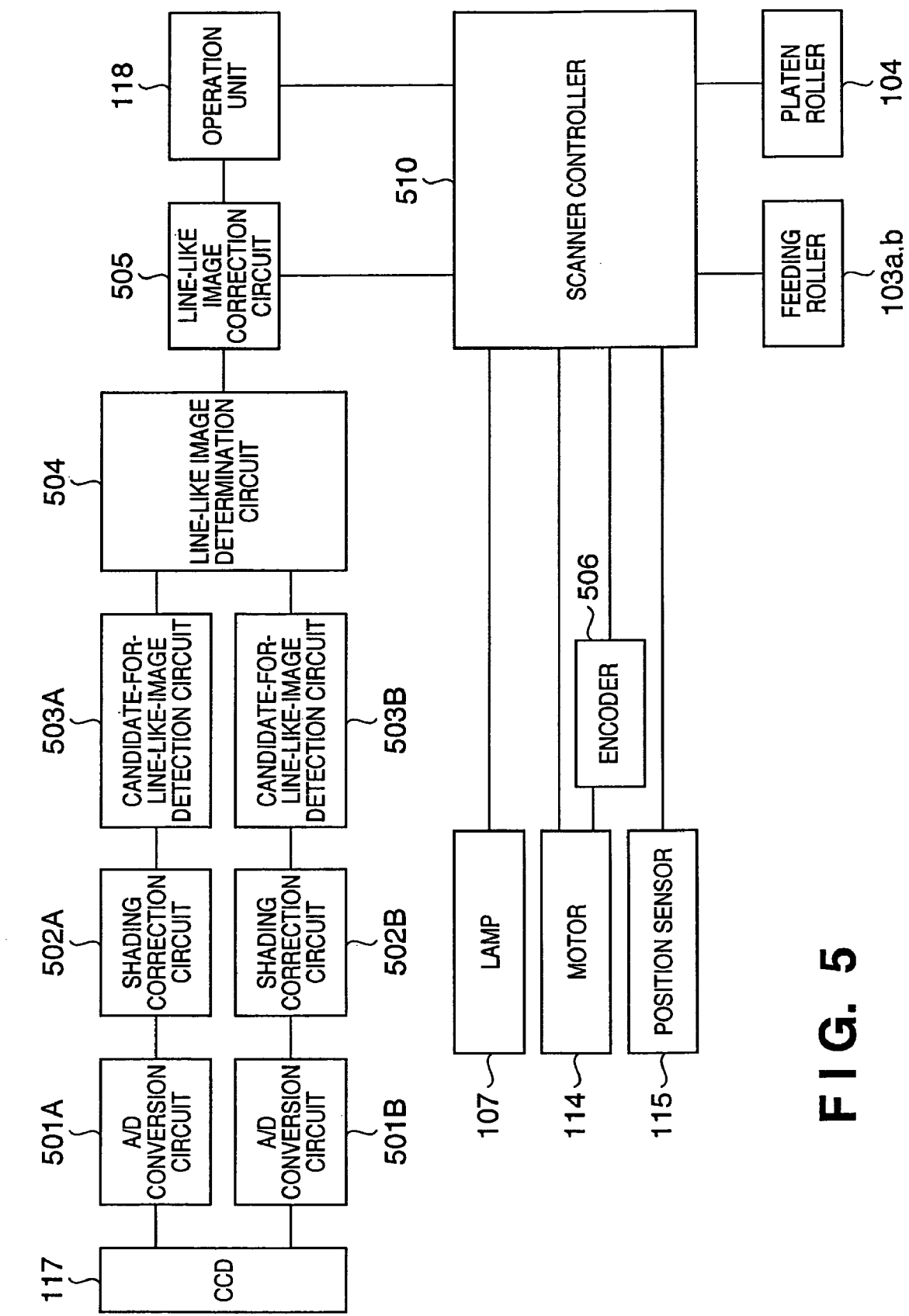
FIG. 5 is a block diagram relating to the control of the image reading apparatus in accordance with the embodiment.

The motor 114 is provided with an encoder (506 in FIG. 5). Outputs from the encoder 506 indicate the numbers of pulses corresponding to the distances the optical benches 109 and 112 have moved. Consequently, the positions of the optical benches 109 and 112 can be determined on the basis of a home position detection signal from the position sensor 115 and encoder pulses from the encoder, provided in the motor 114.

A lens 116 condenses reflected light from the surface of the document guided by the optical benches 109 and 112. A CCD 117 receives the light from the document surface condensed by the lens 116 to carry out photoelectric conversion. An operation unit 118 has, for example, a button used to instruct a reading operation to be started and a display that displays rubbish-detection information indicating the occurrence of an abnormal image or the like.

The image reading apparatus in accordance with the present embodiment controls the reading of the image from the document using either an ADF read mode in which the document fed by the ADF 101 is read or a placed document read mode in which the document placed on the original plate is read. That is, in the ADF read mode, the optical benches 109 and 112 are fixed to document-read positions to read the document fed by the ADF 101. On the other hand, in the placed document read mode, the image is read from the document placed on the platen glass 106 by scanning the optical benches 109 and 112 in a sub-scanning direction.

Figure 2:
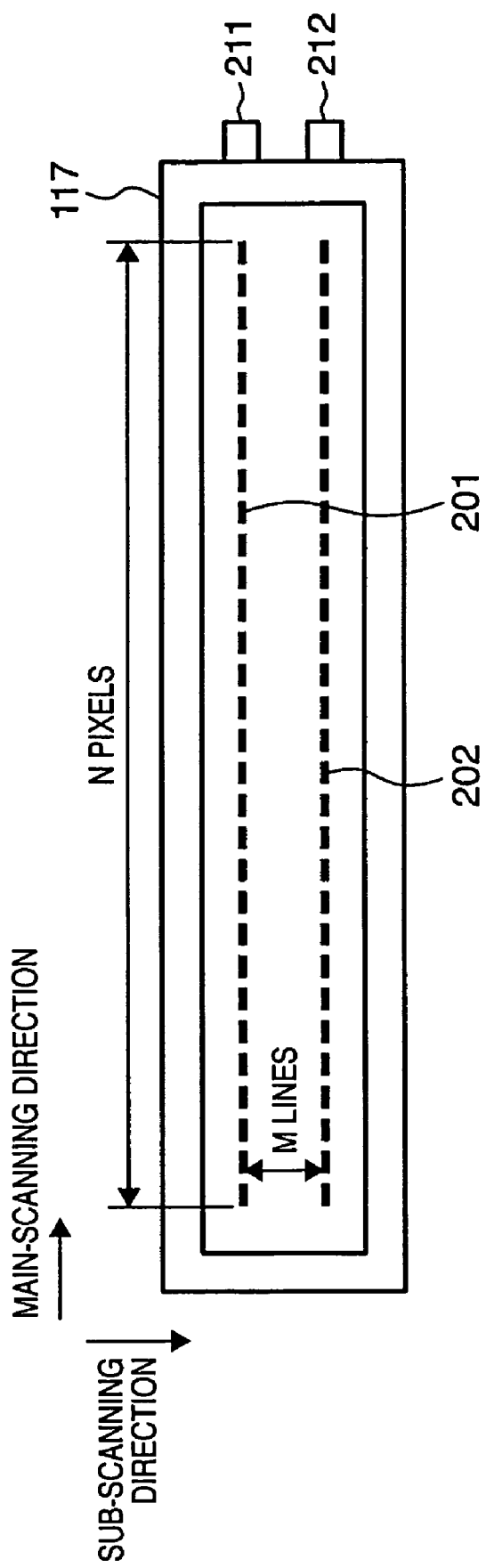
FIG. 2 is a diagram showing an example of an image reading unit in accordance with the embodiment.

FIG. 2 is a diagram showing an example of the image reading unit in accordance with the embodiment. The CCD 117, the image reading unit, includes a plurality of reading units 201 and 202. Each reading unit comprises CCDs corresponding to N pixels and arranged in a main-scanning direction. The spacing between the first reading unit 201 and the second reading unit 202 is equal to M lines in the sub-scanning direction.

In this example, the first reading unit 201 is located on an upstream side in the direction in which the document is fed (in the sub-scanning direction in the figure). The second reading unit 202 is located on a downstream side in this direction. That is, the first reading unit 201 reads the image from the document located at a first document-read position. The second reading unit 202 reads the image from the document placed at a second document-read position that is located at a predetermined distance downstream of the first document-read position in the document feeding direction.

With the first reading unit 201 and the second reading unit 202 thus arranged, it is possible to concurrently read one line of image at the first document-read position on the upstream side and one line of image at the second document-read position on the downstream side. A read signal from the first reading unit 201 is output from an output terminal 211. A read signal from the second reading unit 202 is output from an output terminal 212.

Figure 3:
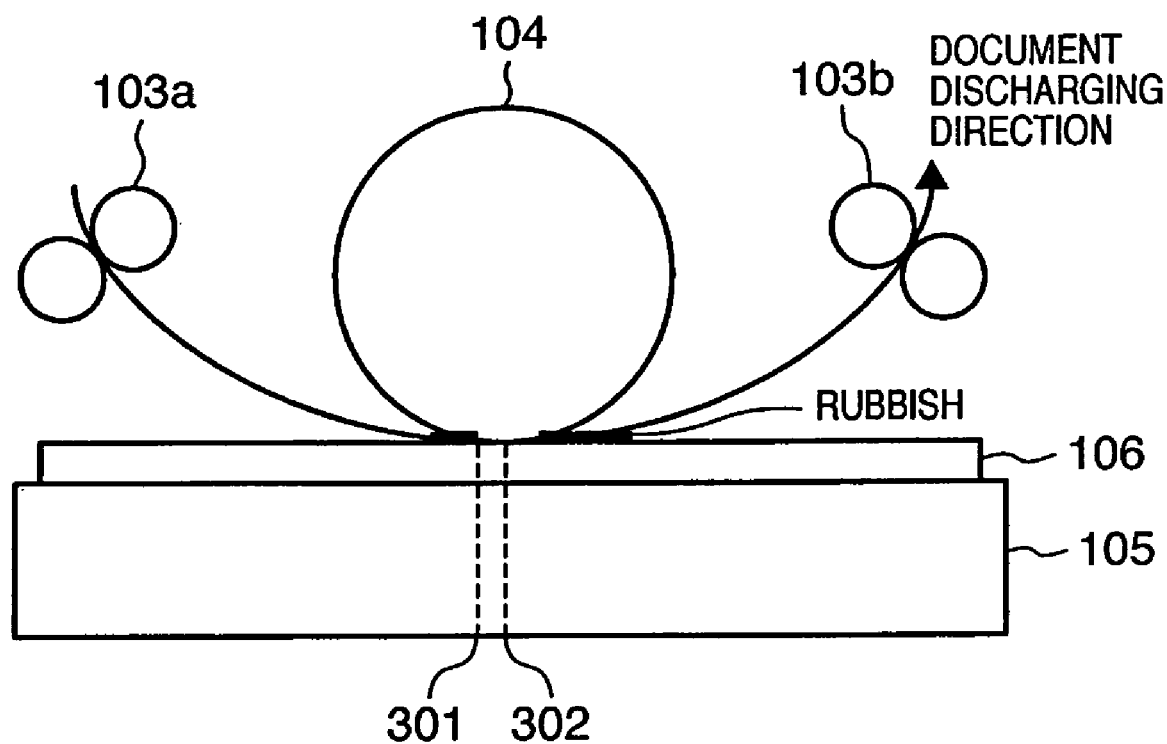
FIG. 3 is a diagram illustrating how rubbish remains on platen glass.

FIG. 3 is a diagram illustrating how rubbish remains on the original plate. With an image reading apparatus comprising an ADF as in the case of the present embodiment, when an image is read from a document in an ADF document read mode, a line-like image (abnormal image) may occur in the read image. This is due to the reading of rubbish stretching over a first document-read position 301 and a second document-read position on the original plate 106.

Figure 4:
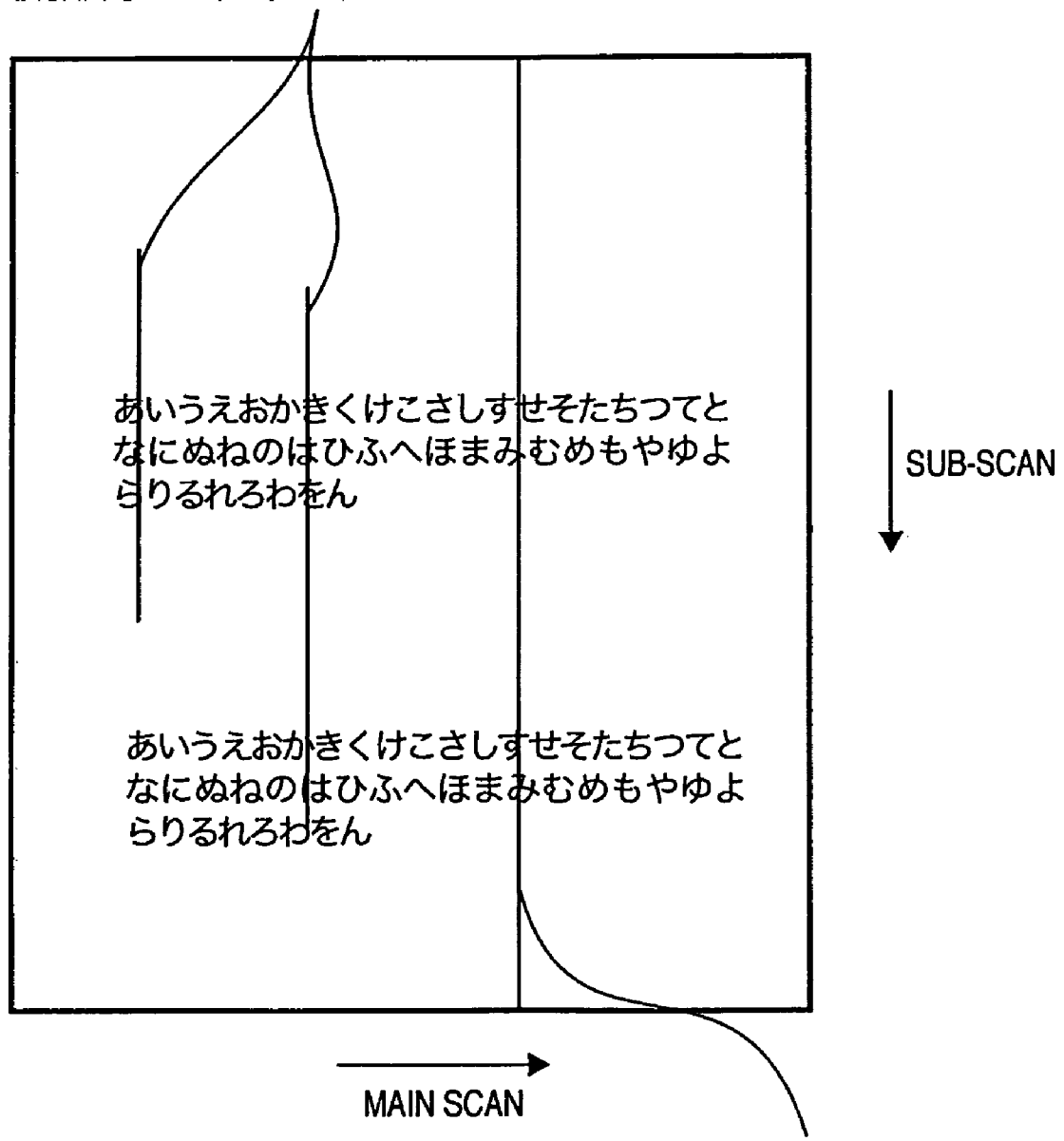
FIG. 4 is a diagram showing an example of an image read if white rubbish is attached to the original plate.

FIG. 4 is a diagram showing an example of an image read if white rubbish is attached to the original plate. The diagram shows that attached white rubbish results in a white line-like image on the document image. In addition, black rubbish attached to the original plate 106 results in a black line-like image on the document image.

FIG. 5 is a block diagram relating to the control of the image reading apparatus in accordance with the embodiment. The description below will be simplified by denoting the components described in FIG. 1 using the same reference numerals.

An A/D conversion circuit 501A subjects an output signal from the output terminal 211 of the CCD 117 to A/D conversion. An output signal from the A/D conversion circuit 501A is input to a shading correction circuit 502A, which further performs shading correction on the characteristics of an optical system including the CCD 117 and the lens 116. A candidate-for-line-like-image detection circuit 503A is a detection unit that detects a candidate for an abnormal image assumed to have resulted from the presence of rubbish on the original plate.

An A/D conversion circuit 501B subjects an output signal from the output terminal 212 of the CCD 117 to A/D conversion. An output signal from the A/D conversion circuit 501B is input to a shading correction circuit 502B, which further performs shading correction on the characteristics of the optical system including the CCD 117 and the lens 116. A candidate-for-line-like-image detection circuit 503B is a detection unit that detects an independent pixel group assumed to have resulted from the presence of rubbish on the original plate. The detected independent pixel group is a candidate for abnormal pixels.

On the basis of positional information on candidates for a line-like image detected by the candidate-for-line-like-image detection circuits 503A and 503B, a line-like image determination circuit 504 finally determines whether or not the candidate is an abnormal image such as a line-like image. The positional information includes, for example, information on a main-scanning position and a sub-scanning position.

A line-like image correction circuit 505 is a reduction unit that reduces the adverse effect of the rubbish. The line-like image correction circuit 505 substitutes data on pixels constituting a line-like image detected by the line-like image determination circuit 504, into another suitable data.

An encoder 506 outputs a pulse used to determine the movement of the motor 114. A scanner control 510 controls the operations not only of the above circuits but also of the CCD 117, lamp 107, motor 114, position sensor 115, feeding roller 103, and platen roller 104, which are required for an image reading process.

Figure 6:
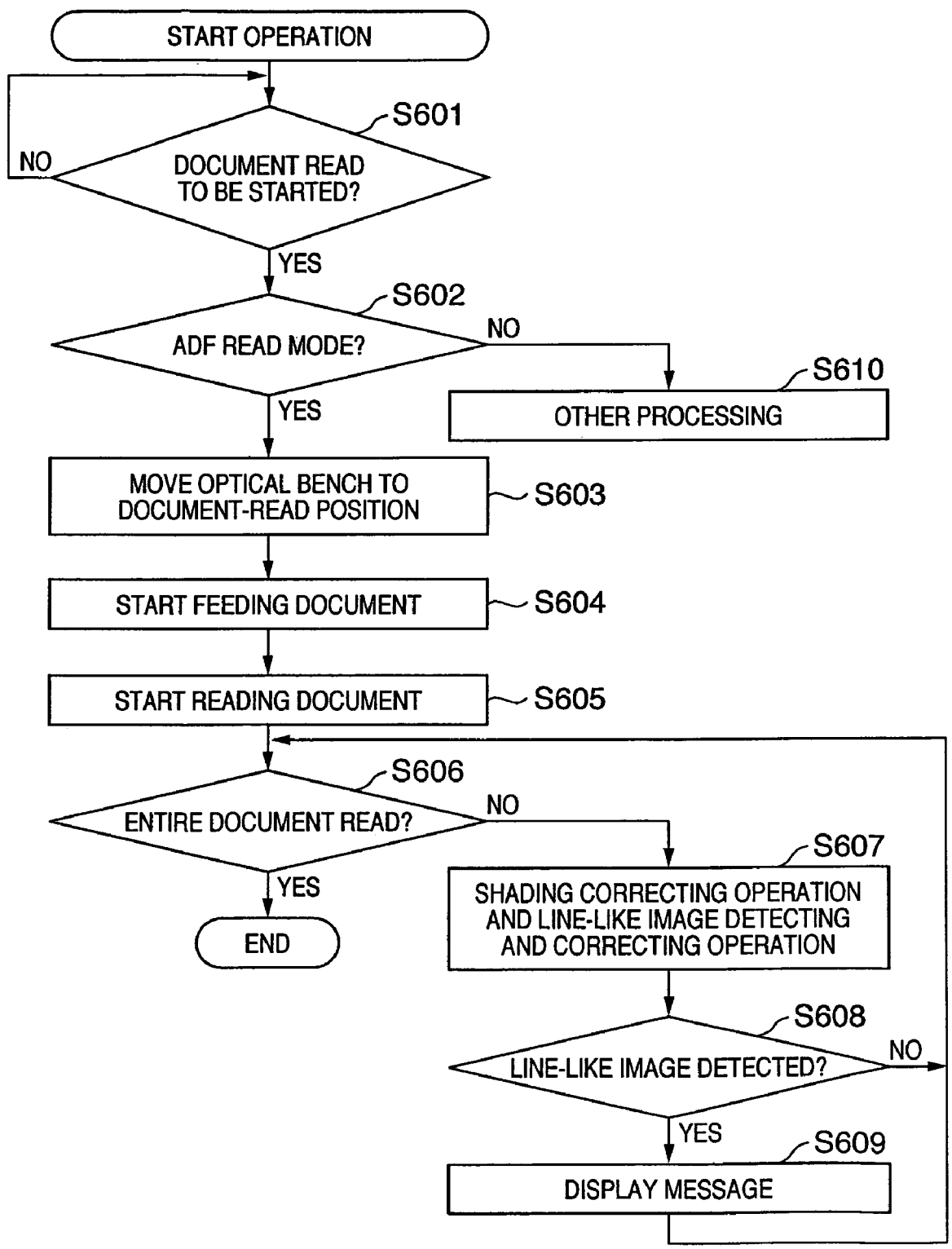
FIG. 6 is a flowchart illustrating an image reading process in accordance with the embodiment.

FIG. 6 is a flowchart illustrating an image reading process in accordance with the embodiment.

In step S601, the scanner controller 510 determines whether an instruction on the start of reading of a document has been given. The instruction on the start of reading of a document is input from the operation unit 118.

In step S602, the scanner controller 510 determines whether or not the instruction on reading involves the ADF document read mode. An instruction on the ADF document read mode or another mode can also be input from the operation unit 118. For the ADF document read mode, the process proceeds to step S603. For a mode different from the ADF document read mode, the process proceeds to step S610 to execute a process corresponding to this mode.

In step S603, the scanner controller 510 controls the motor 114 so that the optical benches 109 and 112 are moved to their document-read positions.

In step S604, the scanner controller 510 lights the lamp 107 and drives the feeding roller 103. The scanner controller 510 thus starts feeding the document 102 on the ADF 101.

In step S605, the scanner controller 510 start reading an image from the document at the document-read positions using the CCD 117.

In step S606, the scanner controller 510 determines whether the document has been entirely read or is still being read. If the document is still being read, the process proceeds to step S607.

In step S607, the scanner controller 510 causes the A/D conversion circuits 501A and 501B to subject image signals output by the CCD 117 to A/D conversion. The shading correction circuits 502A and 502B then perform shading correction on the signals. Subsequently, the scanner controller 510 uses the candidate-for-line-like-image detection circuits 503A and 503B to detect candidates for a line-like image in the image signals subjected to the shading correction. The line-like image determination circuit 504 then detects a line-like image on the basis of the candidate for a line-like image from the candidate-for-line-like-image detection circuit 503A and the candidate for a line-like image from the candidate-for-line-like-image detection circuit 503B. If any line-like image is detected, the line-like image correction circuit 505 corrects the line-like image.

In step S608, the scanner controller 510 determines whether or not the line-like image determination circuit 504 has detected any line-like image. If any line-like image has been detected, the process proceeds to step S609. Otherwise the process proceeds to step S606.

In step S609, the scanner controller 510 displays a message on a display unit of the operation unit 118, the image indicating that, for example, rubbish or an abnormal image has been detected. This makes it possible to urge the user to clean the platen 106. Further, if any line-like image has been corrected, the user may be informed of this.

Moreover, the scanner controller 510 may display information on the location where the rubbish or abnormal image has been detected, on the display unit of the operation unit 118. This allows the user to visually and easily determine the place to be cleaned. For example, if rubbish has been detected in a central portion of the platen 106, the operation unit 118 may display the message "Please Clean Center of Platen" or the like. Such a message may be output by a sound output circuit as a sound.

Steps S608 and S609 are optional. Further, the scanner controller 510 may output a detection message while omitting the correction of a line-like image.

<Candidate-for-Line-Like-Image Detecting Process>

Figure 7:
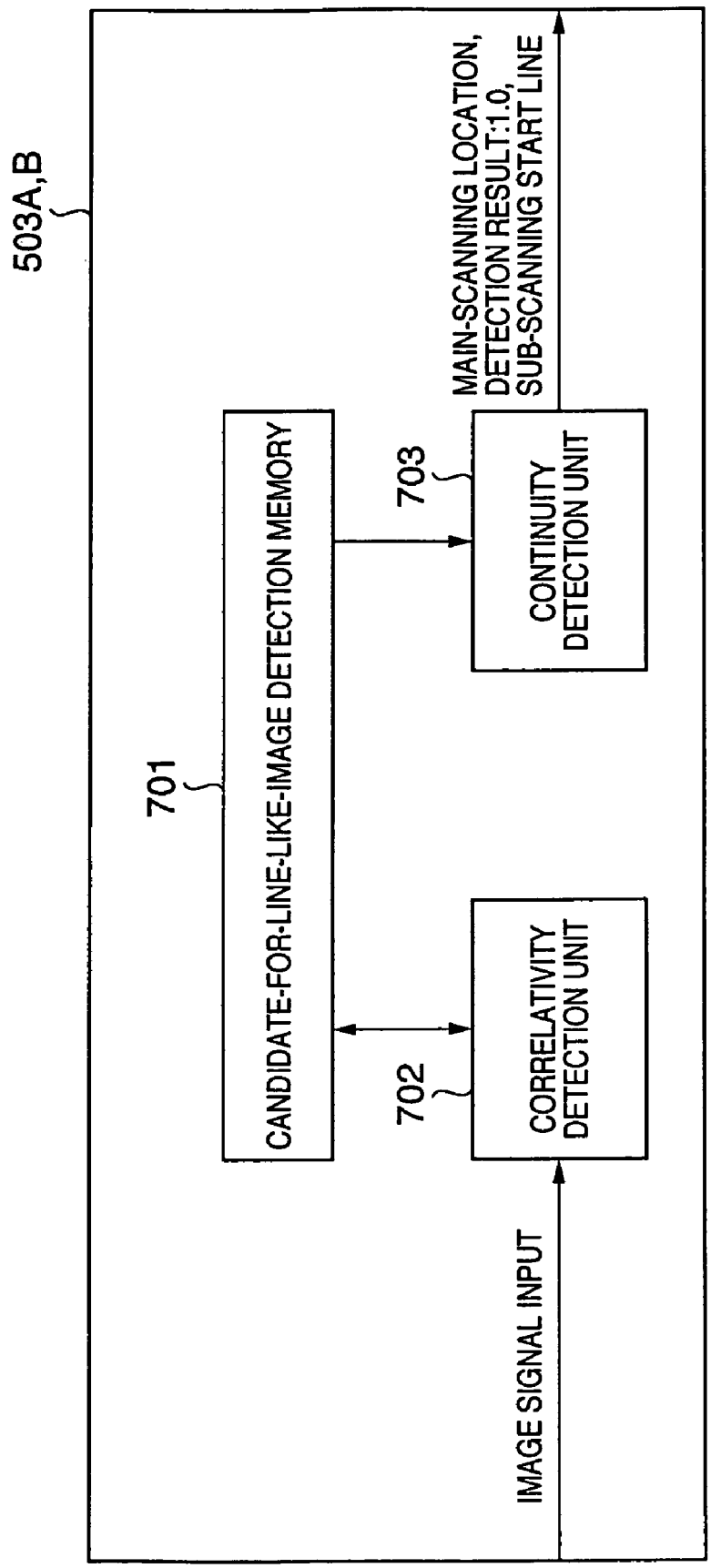
FIG. 7 is a block diagram illustrating a candidate-for-line-like-image detection circuit in accordance with the embodiment.

FIG. 7 is a block diagram illustrating the candidate-for-line-like-image detection circuits in accordance with the embodiment. Each of the candidate-for-line-like-image detection circuits 503A and 503B comprises a candidate-for-line-like-image detection memory 701. The result (for example, information indicating the presence or absence of correlativity) of detection of a correlativity detection unit 702 is saved to the candidate-for-line-like-image detection memory 701. The candidate-for-line-like-image detection memory 701 has storage regions corresponding to the number N of pixels arranged in the CCD 117 in the main-scanning direction. The address of each storage region corresponds to the main-scanning location of the CCD 117.

FIG. 8 is a diagram showing an example of contents stored in the candidate-for-line-like-image detection memory in accordance with the embodiment. For the address 801 corresponding to each main-scan location, the following are stored: information 802 on a sub-scanning start line and the number 803 of candidates for a line-like image detected at the main-scanning location (number of sequential pixels).

For example, if the correlativity detection unit 702 detects a candidate for a line-like image at any main-scanning location for the first time, it stores information on the current sub-scanning line. If the correlativity detection unit 702 detects a candidate for a line-like image at the same main-scanning location on the next sub-scanning line, it increments the number 803 of sequential pixels for the line-like image. On the other hand, if the correlativity detection unit 702 does not detect any candidate for a line-like image on the next sub-scanning line, it clears the information 802 on the sub-scanning start line and the number 803 of sequential pixels.

Thus, the use of the candidate-for-line-like-image detection memory 701 makes it possible to determine the main-scanning location where a candidate for a line-like image has occurred, the sub-scanning line where the candidate for a line-like image started to occur and the number of candidates for a line-like image consecutively detected at that location.

A continuity detection section 703 detects the continuity of a candidate for a line-like image by determining whether or not the number of sequential pixels stored in the candidate-for-line-like-image detection memory 701 has at least a predetermined value. The continuity detection unit 703 transmits the result of detection for the continuity of a candidate for a line-like image to the candidate-for-line-like-image determination circuit 504. The detection result may include information on the main-scanning location, the presence or absence of a candidate for a line-like image (for example, a flag signal for a binary value "1" or "0"), and information on the sub-scanning start line.

Figure 9:
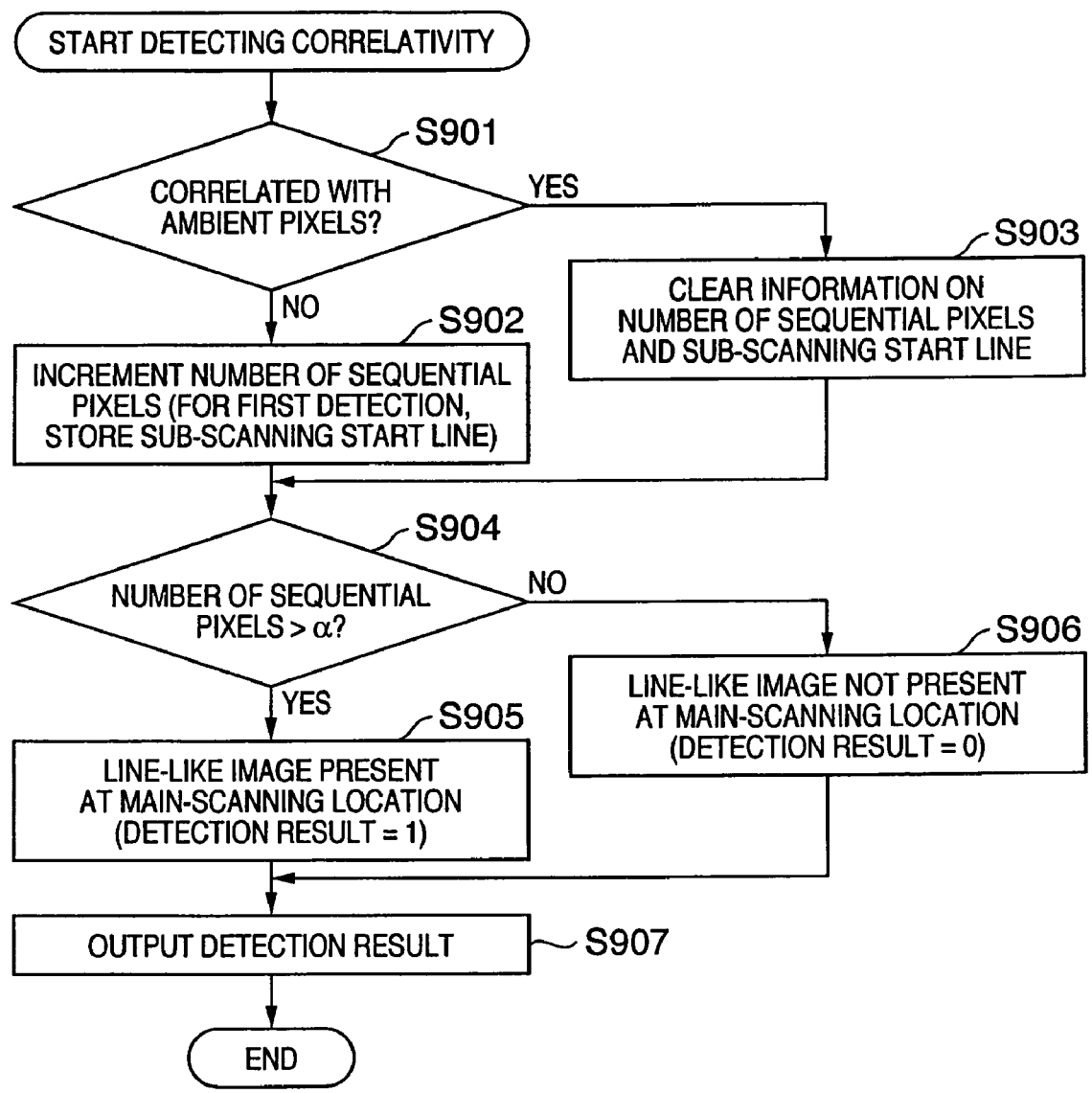
FIG. 9 is a flowchart illustrating a candidate-for-line-like-image detecting process in accordance with the embodiment.

FIG. 9 is a flowchart illustrating a candidate-for-line-like-image detecting process in accordance with the embodiment. In step S901, the correlativity detection unit 702 sequentially uses input image data as a target pixel to determine whether or not the target pixel is correlated with a pixel (ambient pixel) present around the target pixel. To determine the presence or absence of correlativity, the process determines the absence of correlativity when, for example, the image data level of the target pixel is higher than that of the ambient pixel and when the value for the difference in data level is at least a predetermined threshold. The correlativity detection circuit 702 determines the presence of correlativity when the difference is not at least the predetermined threshold. Of course, this determining method is only an example.

If correlativity is absent, the pixel is likely to be a candidate for a line-like image. In step S902, the correlativity detection section 702 reads the number of sequential pixels from the address in the memory 701 corresponding to the current main-scanning location. The correlativity detection section 702 then increments and stores the value. If the number of sequential pixels prior to the incrementation is "0", a candidate for a line-like image has been detected at the main-scanning location for the first time. Thus, the current sub-scanning line is stored in the memory 701 as a start line.

On the other hand, if correlativity is present, the pixel is unlikely to be a candidate for a line-like image. In step S903, the correlativity detection section 702 clears the number of sequential pixels to "0" and stores this value at the address in the memory 701 corresponding to the current main-scanning location. The correlativity detection section 702 also clears information on the sub-scanning start line.

In step S904, the continuity detection section 703 reads the number of sequential pixels stored in the candidate-for-line-like-image detection memory 701 to determine whether or not the number exceeds a predetermined value α.

If the number of sequential pixels exceeds the value α, the process proceeds to step S905 to set the detection result to "1". This is because a stripe resulting from rubbish or the like is presumed to be present at the current main-scanning location.

On the other hand, if the number of sequential pixels does not exceed the value α, the process proceeds to step S906 to set the detection result to "0". This is because no stripe resulting from rubbish or the like is presumed to be present at the current main-scanning location.

In step S907, the continuity detection unit 703 outputs the detection result, the information on the main-scanning location, and the information on the sub-scanning start line to the line-like image determination circuit 504.

Figure 10:
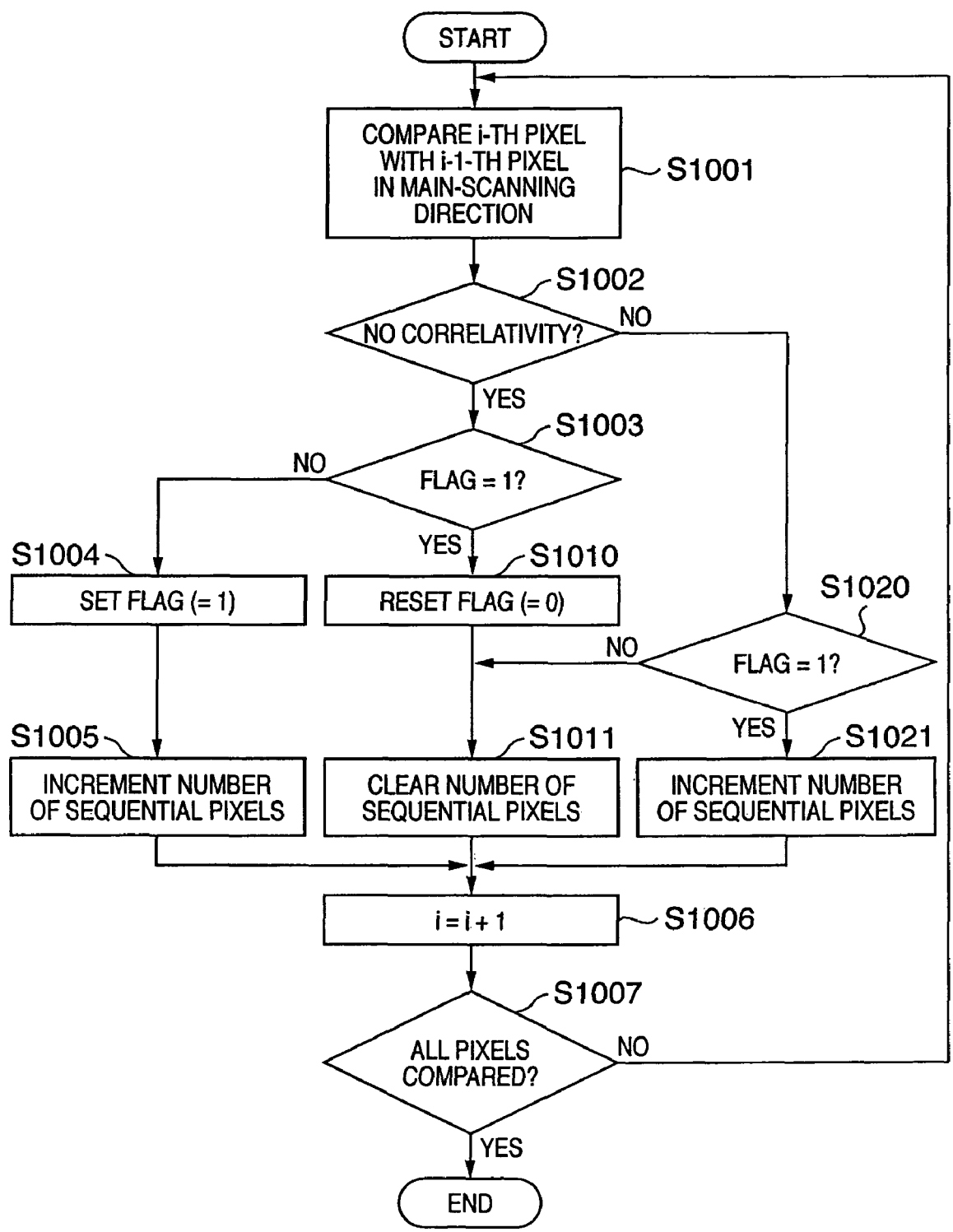
FIG. 10 is a flowchart illustrating a correlativity detecting process in accordance with the embodiment.

FIG. 10 is a flowchart illustrating a correlativity detecting process in accordance with the embodiment. In this example, improvements are made to detect a line-like image with a width equal to or larger than two pixels. Before a detailed description with reference to FIG. 10, description will be given of the technical background of detection of a line-like image. In the present embodiment, a correlativity comparison unit 702 detects whether or not an ambient pixel to the left of the target pixel is correlated with the target pixel. Here, the coordinates (main-scanning location and sub-scanning line) of the target pixel are defined as (i, j). The coordinates of the left ambient pixel located immediately adjacent to the target pixel in the main-scanning direction can be expressed as (i−1, j). Normally, the pixel (i−1, j) located immediately adjacent to the target pixel is a comparison pixel.

Figure 11:
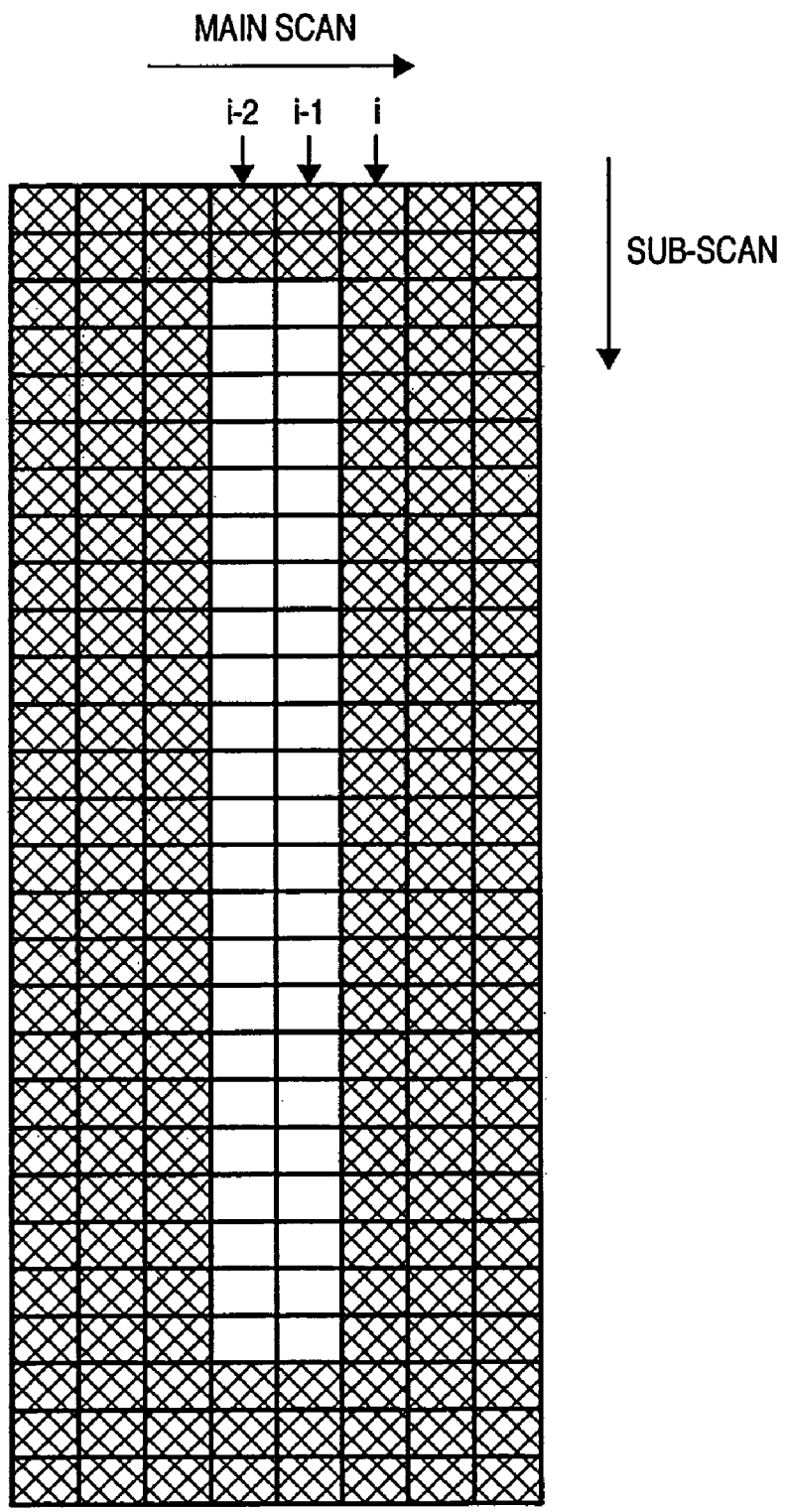
FIG. 11 is a diagram showing an example of a white line-like image with a width equal to two-pixels.

FIG. 11 is a diagram showing an example of a white stripe with a width equal to two pixels. For example, description will be given of the white stripe with a width equal to two pixels shown in the figure. Of the pixels constituting the white stripe, the pixels at the i−1-th main-scanning position are compared with the pixels with the i−2-th main-scanning position. Since both pixels belong to the white stripe, they are determined to correlated with each other. This precludes the white stripe from being detected.

Accordingly, if the target pixel (i, j) is not correlated with the leftward ambient pixel (i−1, j), the correlativity between the target pixel (i, j) and the further leftward (i−2, j) is determined. If the target pixel (i, j) is also uncorrelated with the leftward ambient pixel (i−2, j), the correlativity between the target pixel (i, j) and the further leftward (i−3, j) is determined.

The third leftward ambient pixel (i−2, j) from the target pixel is checked for correlativity in order to detect a line-like image with a width equal to at least two pixels.

Description will be given below of a more generalized process for detecting a line-like image. The concept of a line-like image detection flag is applied to this process to enable a line-like image to be suitably detected without the need to compare the target pixel (i, j) directly with the third leftward ambient pixel (i−2, j) from the target pixel.

Specifically, a focus is placed on the following fact. When a pixel group that is not rubbish changes to a group of pixels for a line-like image, the correlativity changes from "present" to "absent". When a group of pixels for a line-like image changes to a pixel group that is not rubbish, the correlativity also changes from "present" to "absent". Thus, when the correlativity first changes from "present" to "absent", the flag is set. As long as the flag is set, the determination of the correlativity remains reversed. For example, if the correlativity is determined to be absent, the determination is reversed to "present". When the correlativity changes from "present" to "absent", the flag is reset. This enables the number of sequential pixels to be incremented for a line-like image.

In step S1001, the correlativity comparison unit 702 compares the i-th pixel with the i−1-th pixel in the main scanning direction. That is, the correlativity comparison unit 702 executes a correlation calculation on both pixels.

In step S1002, the correlativity comparison unit 702 determines whether the correlation calculation indicates the presence of the correlativity. When the calculation indicates the "presence", the process proceeds to step S1020. When the calculation indicates the "absence", the process proceeds to step S1003.

In step S1003, the correlativity comparison unit 702 determines whether or not the flag is set (Flag=1). It is assumed that the flag is initially reset (Flag=0). If the flag is set, the process proceeds to step S1010. If the flag is not set, the process proceeds to step S1004.

In step S1004, the correlativity comparison unit 702 sets the flag. This indicates that a line-like image resulting from rubbish has been detected.

In step S1005, the correlativity comparison unit 702 increments the value of the number of sequential pixels by one. On this occasion, if the number of sequential pixels is 0, the sub-scanning start coordinates are also recorded in the memory 701.

In step S1006, the correlativity comparison unit 702 increments the value of i to set the target pixel to the next pixel in the main-scanning direction.

In step S1007, the correlativity comparison unit 702 determines whether a comparing process has been executed on all the pixels. If the comparing process has not been finished, the process returns to step S1001.

If the correlativity comparison unit 702 determines in step S1003 that the flag is set, then in step S1010, the correlativity comparison unit 702 resets the flag. This indicates the end of the line-like image.

In step S1011, the correlativity comparison unit 702 clears the number of sequential pixels and the sub-scanning start coordinates. Subsequently, the process proceeds to step S1006.

On the other hand, if the correlativity is determined to be "present" in step S1002, then in step S1020, the correlativity comparison unit 702 determines whether or not the flag is set. If the flag is set, the target pixel is a part of the line-like image because the leftward adjacent image is a part of the line-like image. Thus, if the flag is set, the process proceeds to step S1021, where the correlativity comparison unit 702 increments the number of sequential pixels by one. Subsequently, the process proceeds to step S1006.

If the flag is not set, the leftward adjacent pixel is not a part of the line-like image and neither is the target pixel. Thus, the process proceeds to step S1011 to clear the number of sequential pixels. Subsequently, the process proceeds to step S1006.

As described above, the use of the line-like image detection flag makes it possible to suitably detect a line-like image with a width equal to at least two pixels.

<Example of a White Line-Like Image Present in a Document Image and an Example of a Detection Result>

FIG. 12 is a diagram showing another example of the relationship between a target pixel and ambient pixels in accordance with the embodiment. In this example, ambient pixels include 2×5 (main-scanning pixels×sub-scanning pixels)=10 pixels present to the left of a target pixel a and 2×5 (main-scanning pixels×sub-scanning pixels)=10 pixels present to the right of a target pixel a.

Figure 13:
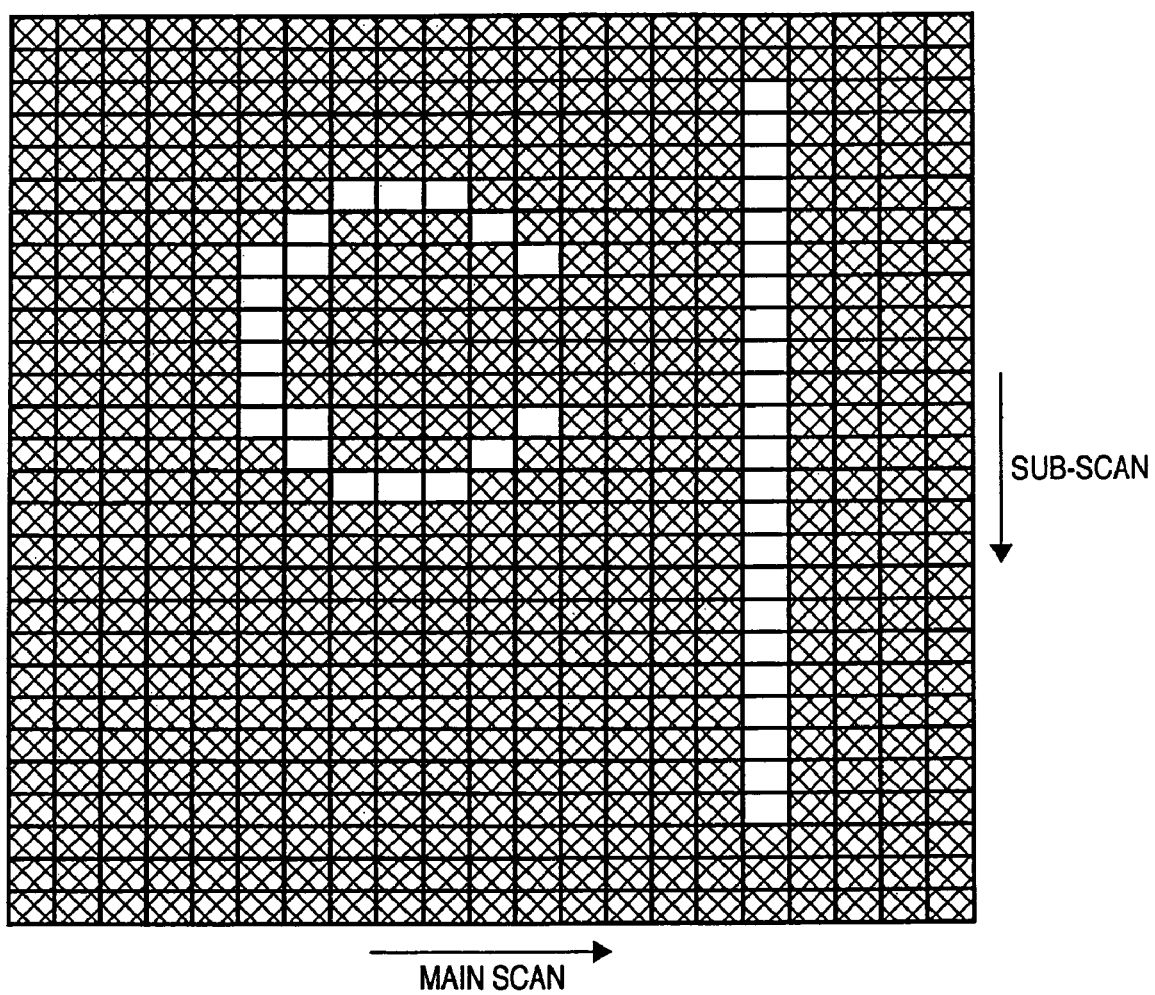
FIG. 13 is a diagram showing an example of a white line-like image present in a document image.

FIG. 13 is a diagram showing an example of a white line-like image present in a document image. This example shows that a white line-like image is present to the right of the letter "C".

Figure 14:
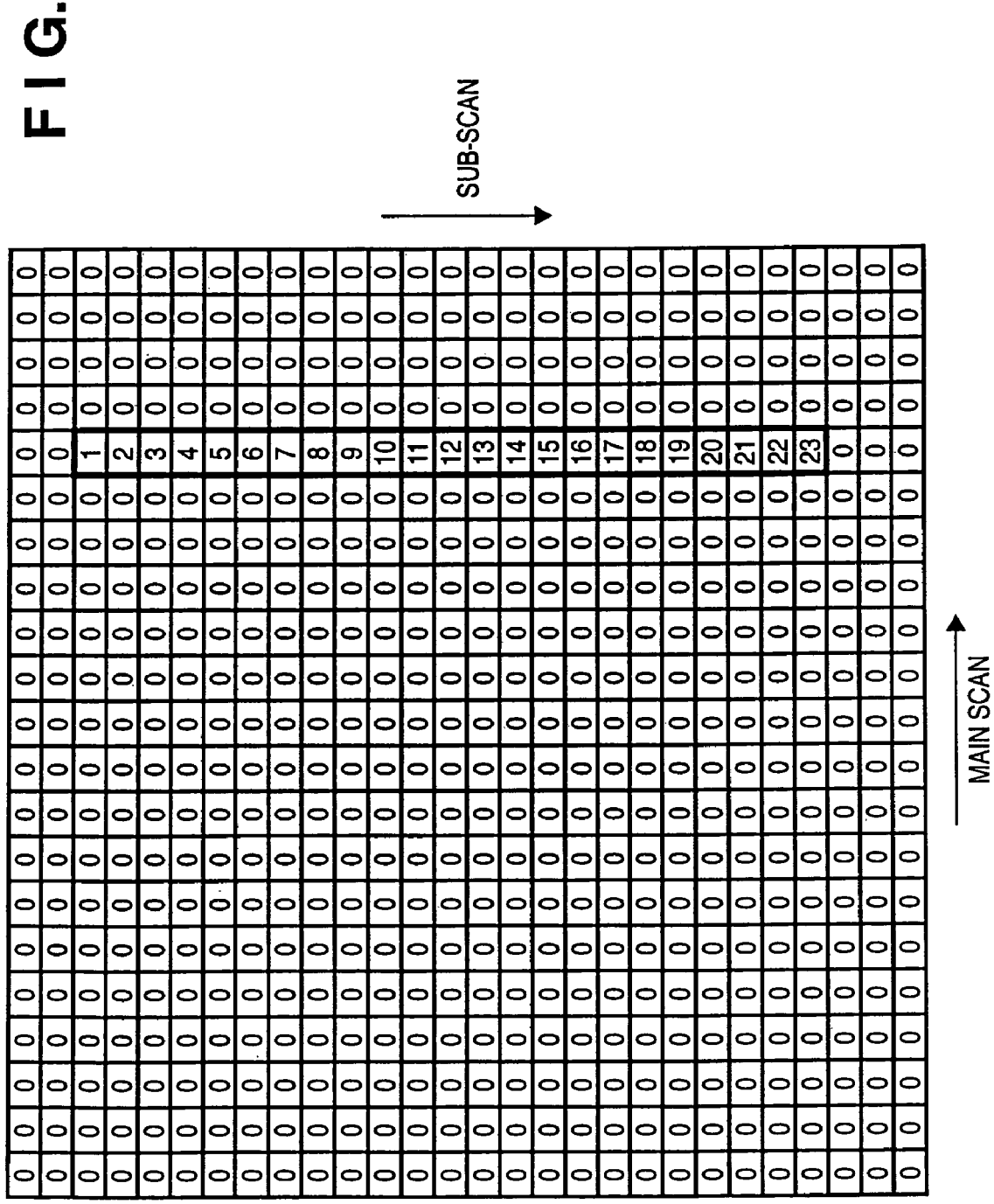
FIG. 14 is a diagram showing an example of data stored in the candidate-for-line-like-image detection memory for the document image in FIG. 13.

FIG. 14 is a diagram showing an example of storage, in the candidate-for-line-like-image detection memory, of the document image shown in FIG. 13. In this example, each rectangle corresponds to one pixel in the image shown in FIG. 13. In other words, the figure shows the contents stored in the candidate-for-line-like-image detection memory 701 and corresponding to the main-scanning locations on the sub-scanning lines. Each of the numerical values in the figure is the number of sequential pixels described above.

Around the periphery of the pixels constituting the letter "C" shown in FIG. 13, other pixels are present which also constitute the letter "C". Accordingly, these pixels are correlated with one another. Thus, the correlativity detection unit 702 determines that the target pixel is correlated with the ambient pixels. The correlativity detection unit 702 then clears the values in the candidate-for-line-like-image detection memory 701 to "0".

On the other hand, the pixels corresponding to the white line-like image are not correlated with the ambient pixels present within the leftward 2×5 range or with the ambient pixels present within the rightward 2×5 range. Thus, the correlativity detection unit 702 increments the number of sequential pixels in the candidate-for-line-like-image detection memory 701 for each of the pixels constituting the white line-like image. Thus, the white line-like image with a width equal to one pixel and a length equal to 23 pixels is detected.

<Black Line-Like Image Detecting Process>

In the description of the above embodiment, the candidate-for-line-like-image detection circuits 503A and 503B detect a white line-like image. However, the candidate-for-line-like-image detection circuits 503A and 503B can of course detect black line-like images. In the white line-like image detecting process, the correlativity detection unit 702 determines the absence of the correlativity if the data level of the target pixel is higher than that of the adjacent pixel by at least a predetermined value. On the other hand, in a black line-like image detecting process, the correlativity detection unit 702 may determine the absence of the correlativity if the data level of the target pixel is lower than that of the adjacent pixel by at least a predetermined value. The subsequent processing is similar to that executed in the white line-like image detecting process.

<Line-Like Image Determining Process>

Figure 15:
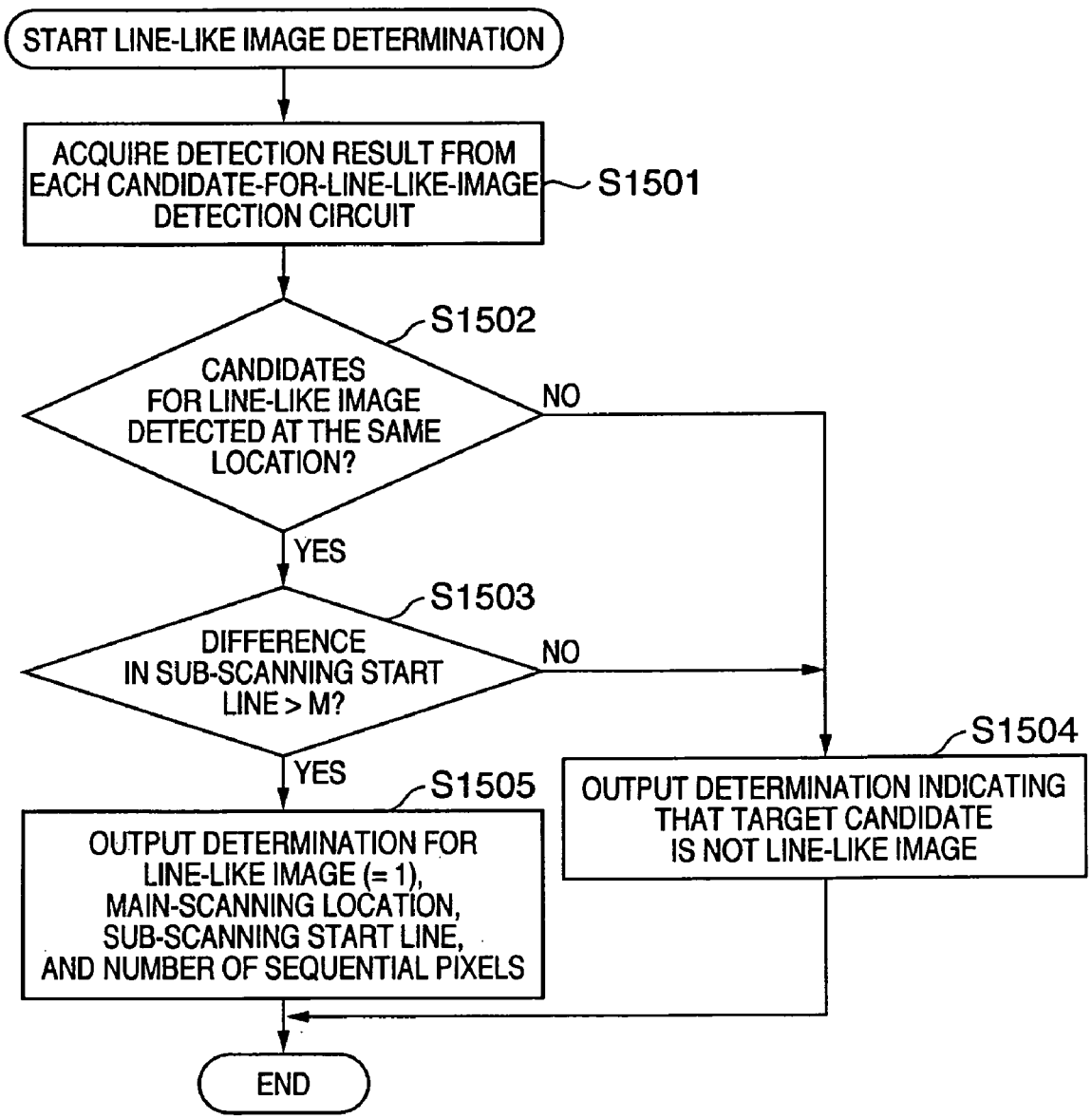
FIG. 15 is a flowchart illustrating a line-like image determining process in accordance with the embodiment.

FIG. 15 is a flowchart illustrating a line-like image determining process in accordance with the present embodiment. The above line-like image determination circuit 504 executes this line-like image determining process.

In step S1501, the line-like image determination circuit 504 receives the result of detection of a candidate for a line-like image from each of the candidate-for-line-like-image detection circuits 503A and 503B. The detection result is assumed to include the presence or absence of a candidate for a line-like image, information on the main-scanning location, information on the sub-scanning line start position, and information on the number of sequential pixels.

In step S1502, the line-like image determination circuit 504 references the detection results from the candidate-for-line-like-image detection circuits 503A and 503B to determine whether or not the candidates for a line-like image lie at the same main-scanning location. If the candidates lie at the same main-scanning location, the process proceeds to step S1503. Otherwise the process proceeds to step S1504.

In step S1503, the line-like image determination circuit 504 determines whether or not the difference between the sub-scanning start line for the upstream-side document-read position and sub-scanning start line for the downstream-side document-read position exceeds M lines. M is equal to the spacing between the image reading units 201 and 202, shown in FIG. 2. If the line-like image determination circuit 504 determines that the sub-scanning start line for the upstream-side candidate-for-line-like-image detection circuit 504A appears M+1 lines earlier than that for the candidate-for-line-like-image detection circuit 504B, the process proceeds to step S1505. Otherwise the process proceeds to step S1504. If the difference between the start lines in the sub-scanning direction is larger than the spacing M between the document-read positions, this is expected to be rubbish located upstream has moved toward the downstream side. Accordingly, M is used as a reference for the determination.

In step S1504, the line-like image determination circuit 504 determines that the candidate for a line-like image is different from a line-like image attributed to rubbish. That is, the line-like image determination circuit 504 sets the determination to 0 and outputs it to the line-like image correction circuit 505.

In step 1505, the line-like image determination circuit 504 determines that the candidate for a line-like image is a line-like image attributed to rubbish. That is, the line-like image determination circuit 504 sets the determination to 1 and outputs it to the line-like image correction circuit 505 together with the main-scanning location, the sub-scanning start line, and the number of sequential pixels. Upon receiving the determination, the line-like image correction circuit 505 corrects the line-like image.

The case of M=3 lines will be more specifically described. When a document is read at a normal feeding speed, an image read at the upstream document-read position 301 is then read at the downstream document-read position 302 three lines later.

Suspended rubbish not fixedly attached to the original plate 106 is moved by, for example, the friction between the document and the original plate 106 or wind resulting from movement of the document. If the suspended rubbish does not completely adhere to the document, then, for example, the friction between the document and the original plate 106 often reduces the movement speed of the suspended rubbish below that of the document.

Consequently, the image read at the same main-scanning location at least four lines earlier is expected to have moved at a speed different from that at which the document has moved. It is therefore possible to determine that the image is different from the original one present in the document.

A change in the feeding speed of the document changes the relative spacing between the document and rubbish which spacing occurs when the document moves from the upstream document-read position 301 to the downstream document-read position 302. Thus, if the feeding speed of the document is changed, a determination reference M' used in step 1503 may be calculated and set as follows:

$$M'=(\text{normal feeding speed/changed feeding speed}) \times M$$

<Line-Like Image Correcting Process>

Now, description will be given of a process of correcting a line-like image. In the present embodiment, the line-like image correction circuit 505 is used to correct a line-like image.

Figure 16:
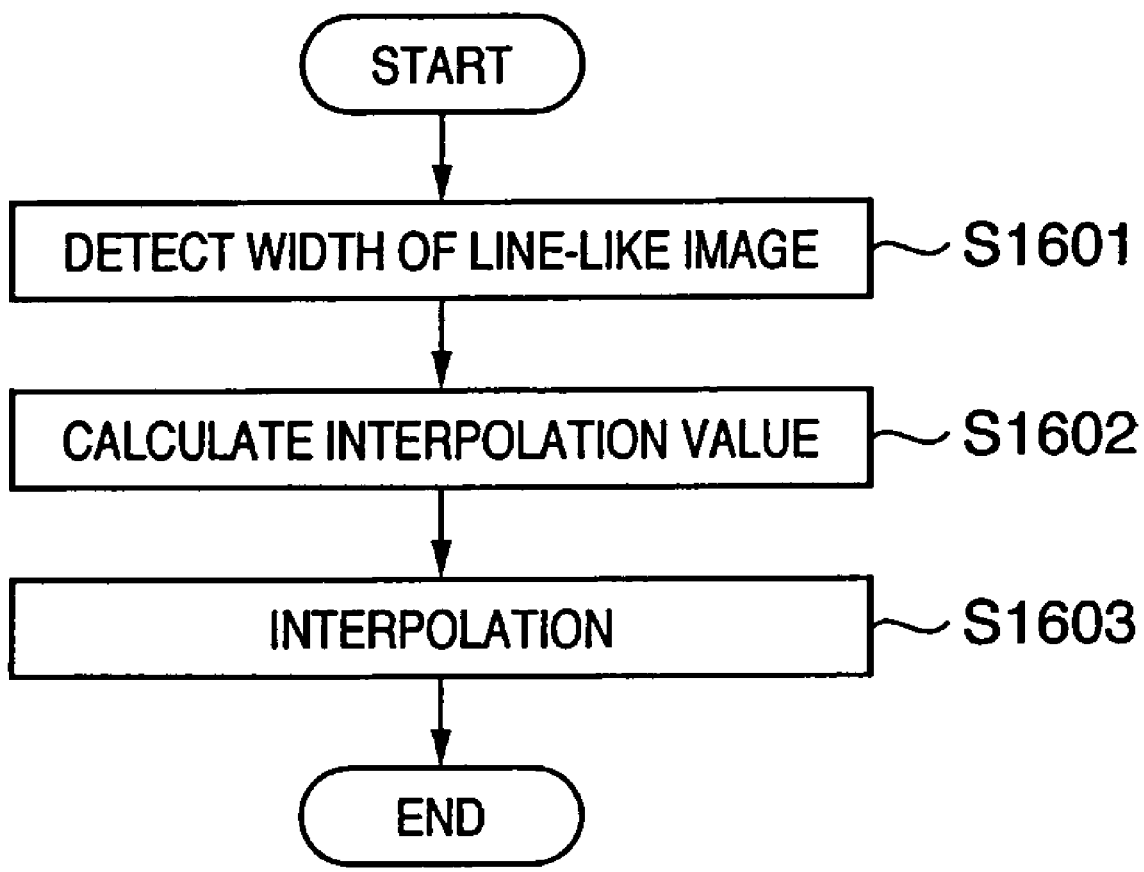
FIG. 16 is a flowchart showing an example of a line-like image correcting process in accordance with the embodiment.

FIG. 16 is a flowchart showing an example of a line-like image correcting process in accordance with the present embodiment. The line-like image correction circuit 505 has an image memory to which read images are saved. The line-like image correction circuit 505 also has a memory that stores determinations (the presence or absence of a line-like image, the main-scanning position, the sub-scanning start line, and the number of sequential pixels) from the line-like image determination circuit 504. These pieces of information are utilized to correct line-like images. Image data to be corrected may be obtained from one or both of the image reading units 201 and 202.

In step S1601, the line-like image correction circuit 505 detects the width of a line-like image in the main-scanning direction; the line-like image has been detected by the line-like image determination circuit 504. For example, since the line-like image determination circuit 504 outputs "1" for the main-scanning locations constituting a line-like image, the line-like image correction circuit 505 detects the number of "1s" consecutively arranged in the main-scanning direction. For example, when two "1s" are consecutively arranged, the width of the line-like image is "2".

In step S1602, the line-like image correction circuit 505 calculates a correction value for each of the pixels constituting the line-like image by using data on the other pixels located adjacent to this pixel. For example, a linear interpolation value is calculated on the basis of data on the adjacent pixels located on the right and left of the target pixel to be corrected.

In step S1603, the line-like image correction circuit 505 uses the correction value to correct the data on the target pixel to be corrected.

Figure 17:
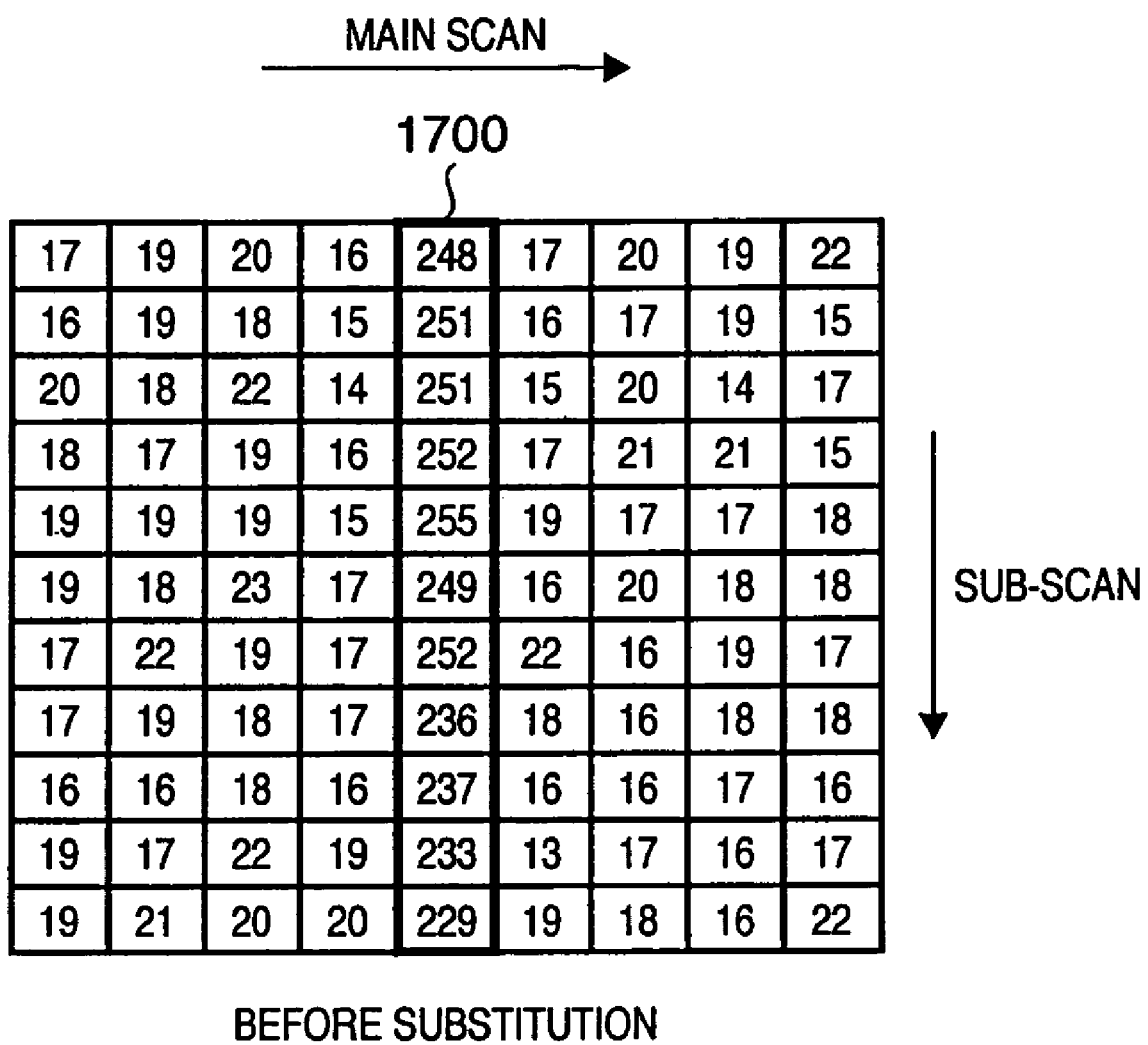
FIG. 17 is a diagram showing an example of uncorrected image data in accordance with the embodiment.

FIG. 17 is a diagram showing an example of uncorrected image data in accordance with the present embodiment. A group of pixels (line-like image) 1700 is detected as a line-like image, the pixels being located in the center of the image and lined up in a vertical direction. It will be appreciated that the data level of these pixels are much higher than those of the ambient pixels (absence of correlativity).

Figure 18:
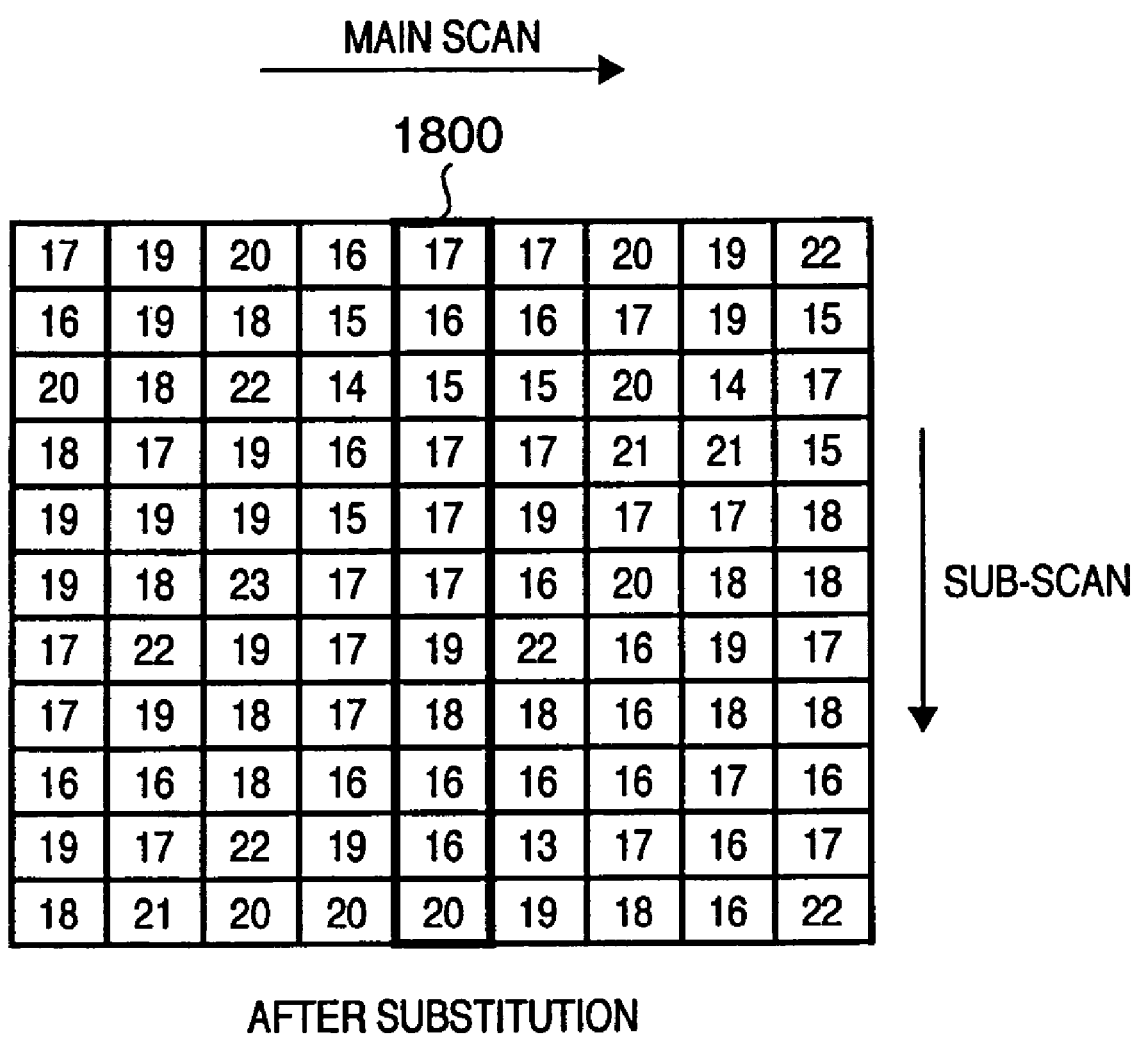
FIG. 18 is a diagram showing an example of corrected image data in accordance with the embodiment.

FIG. 18 is a diagram showing an example of corrected image data in accordance with the present embodiment. A group 1800 of pixels corresponds to the group 1700 of pixels in FIG. 17. As is apparent from the data levels of the pixels contained in the group 1800 of pixels, the data levels of these pixels have been linearly interpolated so as to be equivalent to those of the ambient pixels. That is, the line-like image has been corrected.

Second Embodiment

A second embodiment is the image reading apparatus described in the first embodiment and to which a different correlativity detecting method is applied.

Figure 19:
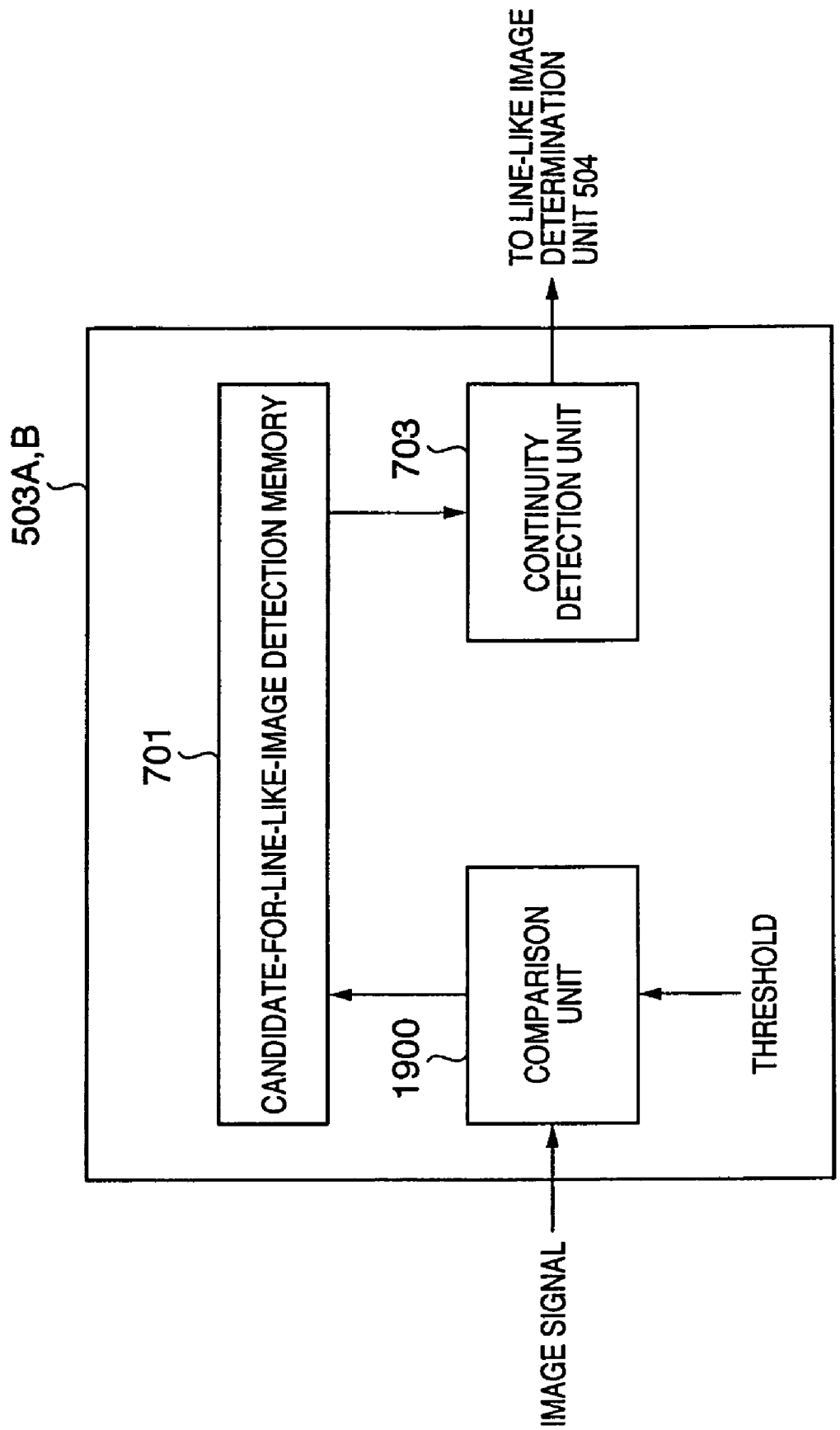
FIG. 19 is a diagram showing another example of a candidate-for-line-like-image detection circuit in accordance with the embodiment.

FIG. 19 is a diagram showing another example of the line-like image detection circuit in accordance with the present embodiment. A comparison unit 1900 is employed in place of the correlativity detection unit 702 in FIG. 7. To detect a white line-like image, the comparison unit 1900 determines whether or not the value of image data level of the target pixel is larger than a predetermined threshold. If the value of image data level of the target pixel is larger than the predetermined threshold, the comparison unit 1900 reads the number of sequential pixels from the address in the memory 701 corresponding to the current main-scanning location. The comparison unit 1900 then increments and stores the value. If the number of sequential pixels is "0" before the incrementation, a candidate for a line-like image has been detected for the first time. The comparison unit 1900 thus stores the current sub-scanning line in the memory 701 as a start line.

On the other hand, if the value of image data level of the target pixel is at most the predetermined threshold, the target pixel is unlikely to be a candidate for a line-like image. Accordingly, the comparison unit 1900 clears the number of sequential pixels to "0" and stores it in the memory 701 at the address corresponding to the current main-scanning location. The comparison unit 1900 also clears the information on the sub-scanning start line.

To detect a black line-like image, the comparison unit 1900 determines whether or not the value of image data level of the target pixel is smaller than a predetermined threshold. If the value of image data level of the target pixel is smaller than the predetermined threshold, the comparison unit 1900 determines the target pixel to be a candidate for a line-like image. If the value of image data level of the target pixel is not smaller than the predetermined threshold, the comparison unit 1900 clears the number of sequential pixels to "0".

Such a simple method can be used to detect a candidate for a line-like image. However, the line-like image detection accuracy achieved by such a method is lower than that achieved by the first embodiment. Thus, if priority is given to simplification of the circuit configuration and a reduction in processing load over the detection accuracy, the second embodiment is more preferable than the first embodiment.

Third Embodiment

A third embodiment is the image reading apparatus described in the first embodiment and to which a different line-like image determining method is applied. That is, the first embodiment focuses on the misalignment between the sub-scanning start lines detected by the plurality of candidate-for-line-like-image detection circuit as candidates for a line-like image, in connection with the same main-scanning location. The present embodiment focuses on the misalignment between sub-scanning end lines that are the end positions of pixels constituting a candidate for a line-like image.

Figure 20:
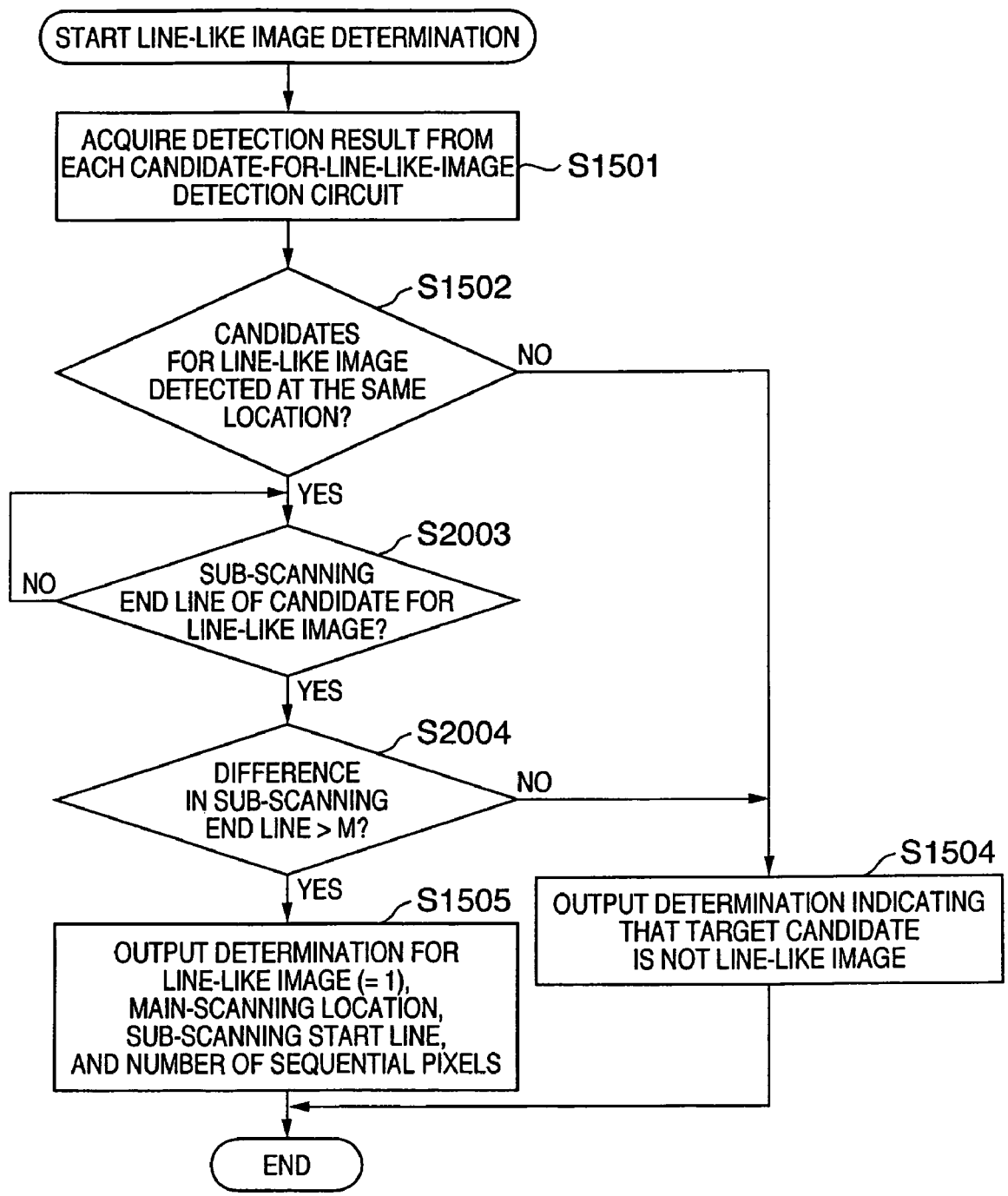
FIG. 20 is another flowchart illustrating candidate-for-line-like-image determining process in accordance with the embodiment.

FIG. 20 is a flowchart illustrating another line-like image determining process in accordance with the present embodiment. The description of the already described components is simplified by denoting them using the same reference numerals as those in the previous embodiments.

The line-like image determination circuit 504 receives the result of detection of a candidate for a line-like image from each of the candidate-for-line-like-image detection circuits 503A and 503B (S1501). The line-like image determination circuit 504 thus determines whether or not the candidates for a line-like image lie at the same main-scanning location (1502). If the candidates lie at the same main-scanning location, the process proceeds to step S2003. Otherwise the process proceeds to step S1504.

In step S2003, the line-like image determination circuit 504 monitors the candidates for a line-like image detected by the candidate-for-line-like-image detection circuits 503A and 503B in connection with the same main-scanning location until it encounters a sub-scanning line that is not a candidate for a line-like image. When the sub-scanning end line of the candidate for a line-like image is detected, the process proceeds to step S2004.

In step S2004, the line-like image determination circuit 504 determines whether or not the difference between the sub-scanning end lines of the candidates for a line-like image detected by the candidate-for-line-like-image detection circuits 503A and 503B exceeds the threshold M. If the difference exceeds the threshold M, the process proceeds to step S1505 because the candidates are considered to be a line-like image for the above reason. On the other hand, if the difference does not exceed the threshold M, the process proceeds to step S1504.

Thus, a line-like image can be suitably detected by monitoring the sub-scanning end lines of candidates for the line-like image.

Forth Embodiment

Notification of Abnormality Such as a Line-Like Image

In the above embodiment, if an abnormal image such as a line-like image occurs, the data level of the abnormal image is reduced by image processing. In this case, it may be convenient if the user can be notified of the occurrence of abnormality such as a line-like image.

Figure 21:
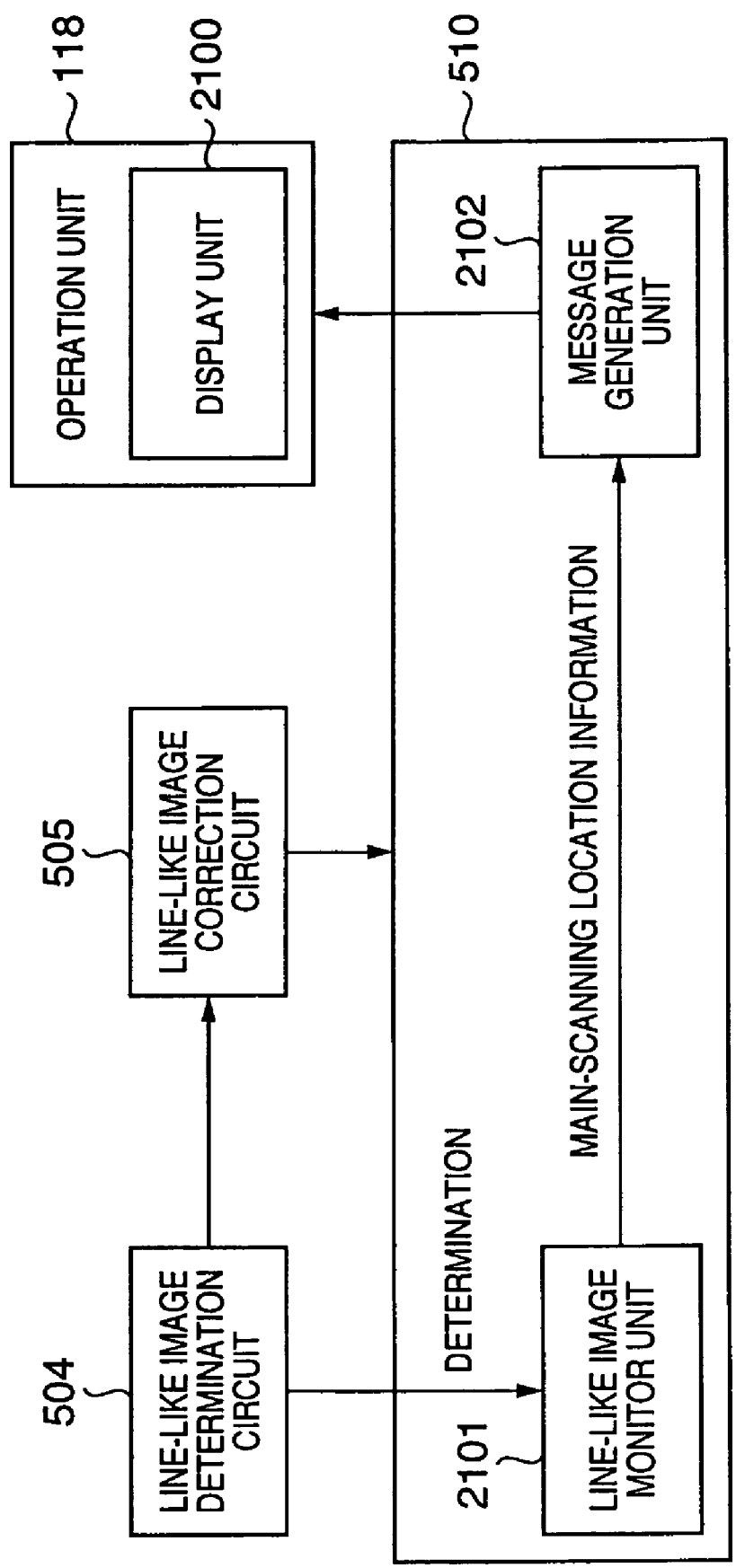
FIG. 21 is a diagram showing another example of the configuration of the image reading apparatus in accordance with the embodiment.

FIG. 21 is a diagram showing another example of configuration of an image reading apparatus in accordance with the present embodiment. The determination made by the line-like image determination circuit 504 is also transmitted to a line-like image monitor unit 2101 in the scanner controller 510. The line-like image monitor unit 2101 detects the occurrence of a line-like image (S608). The line-like image monitor unit 2101 then outputs information on the main-scanning location where the line-like image has occurred, to a message generation unit 2102. The message generation unit 2102 generates a message or the like in accordance with the received information on the main-scanning location, the message prompting the user to clean the desired part or indicating detection of rubbish. For example, if a line-like image has occurred near the center of the original plate, the message generation unit 2102 generates the message "Please Clean near Center of Original plate", "Rubbish Detected near Center of Original plate", or the like. The message generation unit 2102 outputs the message generated to a display unit 2100 in the operation unit 118. The display unit 2100 outputs the message (S609).

Figure 22:
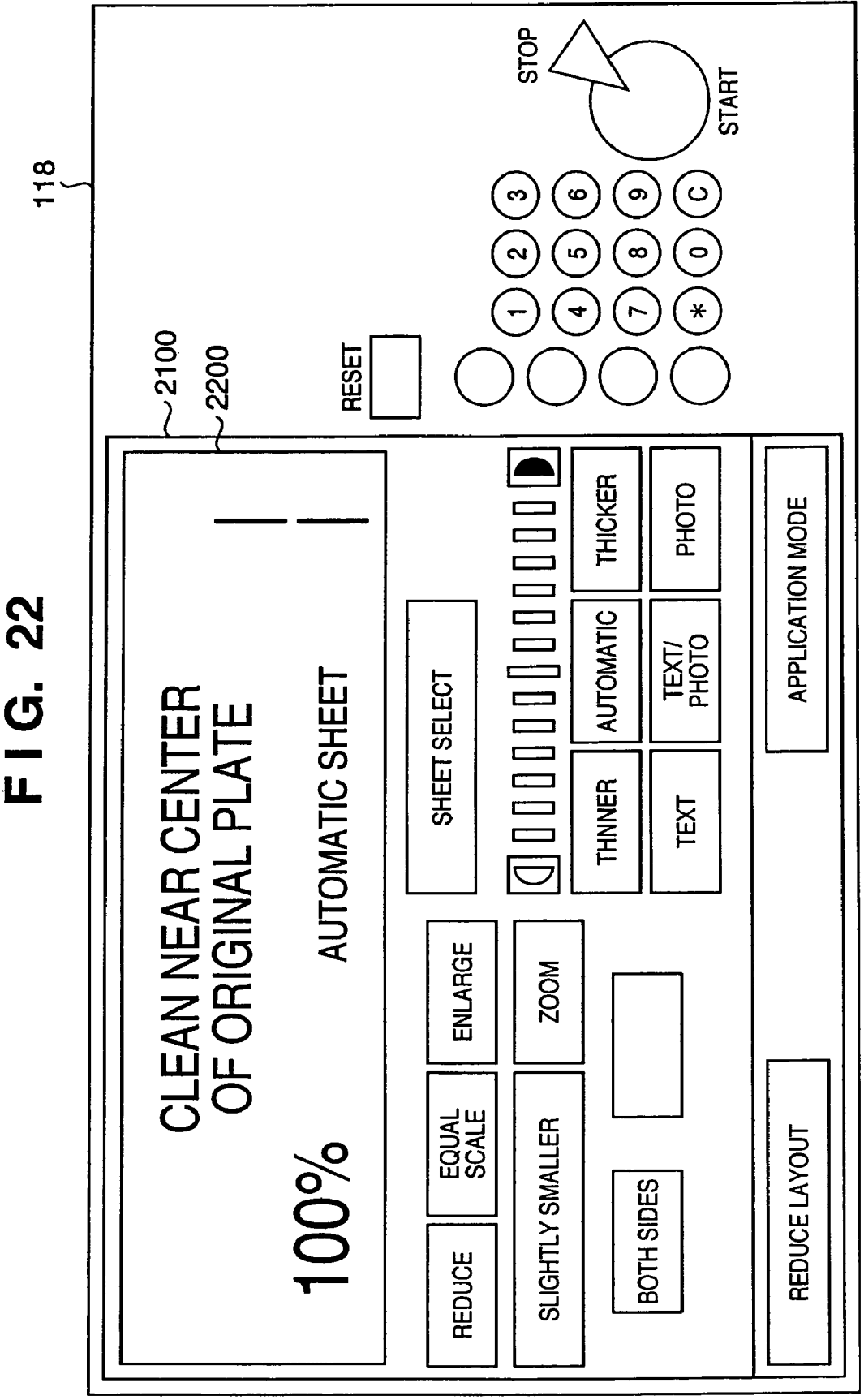
FIG. 22 is a diagram showing an example of a displayed message in accordance with the embodiment.

FIG. 22 is a diagram showing an example of a displayed message in accordance with the present embodiment. It is appreciated that the figure shows that the display unit 2100 is displaying the message 2200 generated. Of course, the message may be output by a sound output device (not shown). Further, the message may be output after executing a process of correcting a line-like image or without executing any correcting process.

This enables the user to recognize the occurrence of a line-like image. In particular, if a line-like image occurs the data level of which cannot be reduced by the line-like image correcting process in accordance with the above embodiments, it is beneficial to call the user's attention because a fundamental cleaning process is required.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-009239 filed on Jan. 17, 2005 which is hereby incorporated by reference herein in its entirety.

What is claimed is:

1. An image reading apparatus that reads an image from a document being simultaneously fed on an original plate, the apparatus comprising:
   a document feeder unit that feeds the document on the original plate;
   a first image reading unit that reads an image from the fed document at a first document-read position on the original plate;
   a second image reading unit that reads an image from the fed document at a second document-read position located at a predetermined distance from the first document-read position in a document feeding direction;
   a first detection unit that detects an independent pixel group in the image of the document read by the first image reading unit, the independent pixel group detected by the first detection unit comprising a plurality of pixels arranged consecutively in the document feeding direction;
   a second detection unit that detects an independent pixel group in the image of the document read by the second image reading unit, the independent pixel group detected by the second detecting unit comprising a plurality of pixels arranged consecutively in the document feeding direction; and
   a determination unit that determines the independent pixel groups to be abnormal if the independent pixel groups detected at the same main-scanning location by the first detection unit and the second detection unit have a positional difference in the sub-scanning direction that is larger than the predetermined distance between the first image reading unit and the second image reading unit in the document feeding direction.

2. The image reading apparatus according to claim 1, wherein if each of the independent pixel groups comprises at least a predetermined number of pixels and does not have correlativity with other pixels present around a periphery of the pixel group, the first and second detection units determine the pixel group to be a candidate for abnormal pixels.

3. The image reading apparatus according to claim 1, wherein if each of the independent pixel groups comprises at least a predetermined number of pixels and is at a data level having a value equal to or smaller than a predetermined threshold, the first and second detection units determine the pixel group to be a candidate for abnormal pixels.

4. The image reading apparatus according to claim 1, further comprising a correction unit that corrects the pixel groups determined to be abnormal by the determination unit.

5. The image reading apparatus according to claim 1, further comprising a notification unit that, if the abnormal pixels occur, notifies a user of the occurrence of the abnormal pixels.

6. The image reading apparatus according to claim 5, wherein the notification unit notifies the user of information on a position where the abnormal pixels have occurred.

* * * * *